US007822052B2

(12) United States Patent
Yoshii et al.

(10) Patent No.: US 7,822,052 B2
(45) Date of Patent: Oct. 26, 2010

(54) COMMUNICATION PROCESSING APPARATUS AND TOTALIZING SYSTEM

(75) Inventors: Hiromu Yoshii, Fukuoka (JP); Hironori Kadota, Fukuoka (JP); Yoko Toyozumi, Fukuoka (JP); Yumiko Ogata, Fukuoka (JP); Taku Yoshida, Fukuoka (JP); Yoshiyuki Maeda, Fukuoka (JP); Yoshiko Sakamoto, Fukuoka (JP); Seiji Miyata, Fukuoka (JP); Kazuyuki Inomoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 286 days.

(21) Appl. No.: 11/898,771

(22) Filed: Sep. 14, 2007

(65) Prior Publication Data

US 2008/0002589 A1 Jan. 3, 2008

Related U.S. Application Data

(63) Continuation-in-part of application No. 11/489,520, filed on Jul. 20, 2006, now abandoned.

(30) Foreign Application Priority Data

Mar. 21, 2006 (JP) ............................ 2006-077877
Oct. 27, 2006 (JP) ............................ 2006-293147

(51) Int. Cl.
*H04L 12/56* (2006.01)

(52) U.S. Cl. ...................................... 370/412; 370/252

(58) Field of Classification Search .......... 370/412–429
See application file for complete search history.

(56) References Cited

U.S. PATENT DOCUMENTS

| | | | | |
|---|---|---|---|---|
| 6,246,701 | B1 * | 6/2001 | Slattery | 370/503 |
| 6,618,815 | B1 * | 9/2003 | Atkins et al. | 713/400 |
| 2003/0037091 | A1 * | 2/2003 | Nishimura et al. | 709/103 |

FOREIGN PATENT DOCUMENTS

| | | |
|---|---|---|
| JP | 01-225259 | 9/1989 |
| JP | 2001-297071 A | 10/2001 |
| JP | 2004-120509 | 4/2004 |

* cited by examiner

*Primary Examiner*—Phuc Tran
(74) *Attorney, Agent, or Firm*—Hanify & King, PC

(57) ABSTRACT

A communication processing apparatus appends group information representing a group to received communication frames. Group information to be appended to the communication frames is changed on a predetermined cycle. The communication frames processed in each processing unit are counted separately for each of the group information appended, and the count value is collected in each processing unit. With a communication processing apparatus, such as a switch and a router, which has a plurality of processing units (device), performs processing by each of the processing units on the communication frames received from a receiving unit, and transmits the processed communication frames from a transmitting unit, it is possible to realize a communication processing apparatus and a totalizing system capable of accurately counting and collecting the communication frames while performing an operation when totalizing the number of communication frames processed in each of the processing units.

24 Claims, 22 Drawing Sheets

F I G. 6
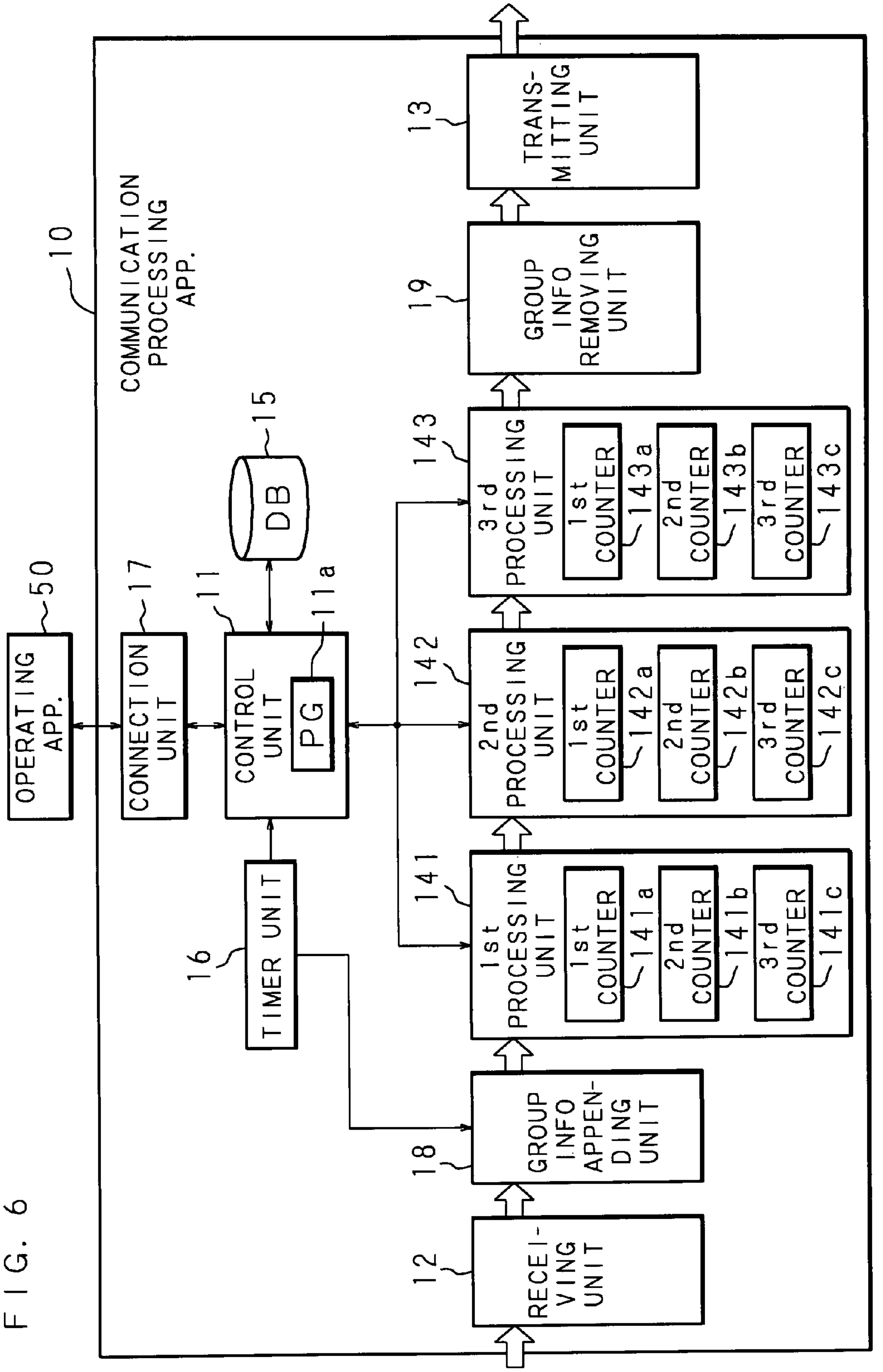

F I G. 8
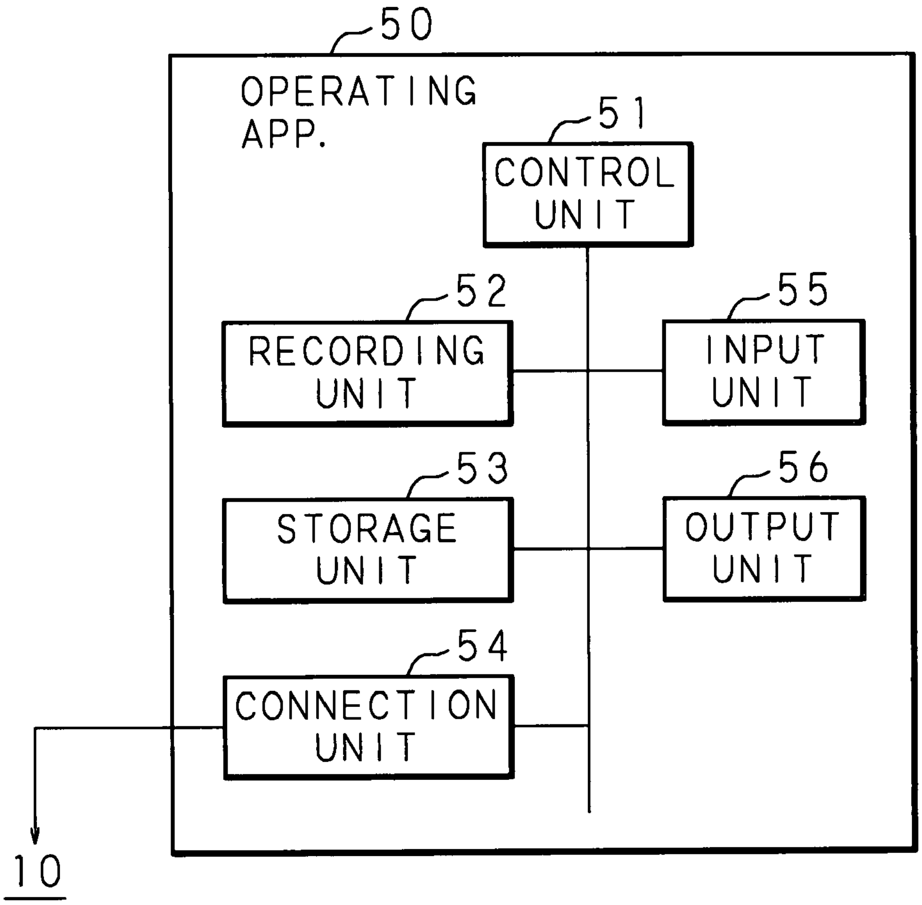

F I G. 1 2

| GROUP | 1st GROUP | 2nd GROUP | 3rd GROUP | 1st GROUP | 2nd GROUP | 3rd GROUP |
|---|---|---|---|---|---|---|
| 1st COUNTER | 3 | 3 | 3 0 | 2 | 2 | 2 0 |
| 2nd COUNTER | 0 | 4 | 4 | 4 0 | 1 | 1 |
| 3rd COUNTER | 0 | 0 | 5 | 5 | 5 0 | 3 |
| COLLECTED COUNT VALUE | 0 | 0 | 3 | 4 | 5 | 2 |

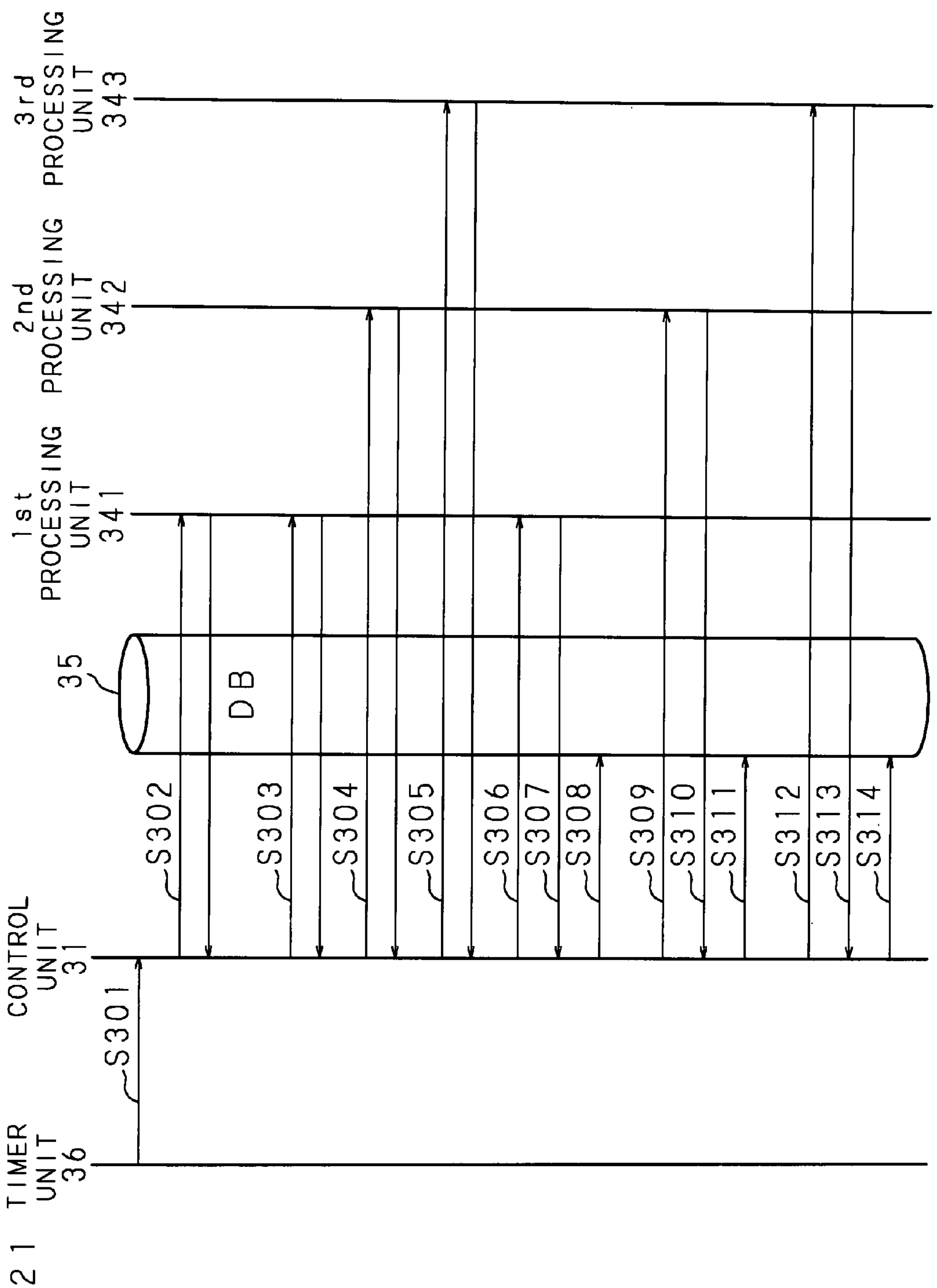
F I G. 21

COMMUNICATION PROCESSING APPARATUS AND TOTALIZING SYSTEM

CROSS-REFERENCE TO RELATED APPLICATIONS

This is a continuation-in-part of U.S. patent application Ser. No. 11/489,520, filed on Jul. 20, 2006 now abandoned.

BACKGROUND OF THE INVENTION

1. Field of the Invention

The present invention relates to a communication processing apparatus that receives communication frames, processes the received communication frames sequentially, and transmits the processed communication frames, and more particularly relates to a communication processing apparatus to be used as an apparatus, such as a switch or a router, for use in connecting communication networks. The present invention also relates to a totalizing system for totalizing the number of frames processed by such a communication processing apparatus.

2. Description of Related Art

With the development of communication networks such as LAN, WAN, and the Internet, communication processing apparatuses such as switches and routers for use in connecting communication networks have been developed. In addition to their fundamental functions including a transfer function, a routing function, and the like, various functions, such as the function of monitoring the communication status, and the like, were proposed and realized for these communication processing apparatuses (see, for example, Japanese Patent No. 2510875).

FIG. 1 is a block diagram showing a configuration example of a conventional communication processing apparatus.

In FIG. 1, reference numeral 100 denotes a communication processing apparatus. The communication processing apparatus 100 comprises a control unit 101 for controlling the entire apparatus; a receiving unit 102, connected to a communication network, for receiving communication frames; and a transmitting unit 103 for transmitting the received communication frames. The communication frames received by the receiving unit 102 are processed by a first processing unit 1041, a second processing unit 1042 and a third processing unit 1043, and then passed to the transmitting unit 103 and transmitted from the transmitting unit 103 to an external communication network.

Processing to be performed by the first processing unit 1041, second processing unit 1042 and third processing unit 1043 is processing for realizing functions to be fundamentally executed by the communication processing apparatus, such as a transfer function, a routing function, and the like. For example, the first processing unit 1041 and third processing unit 1043 perform processing related to a layer 1 (physical layer) in an OSI reference model, and the second processing unit 1042 performs processing related to a layer 2 (data link layer).

A computer program (PG) 101*a*, such as firmware, is stored in the control unit 101 of the communication processing apparatus 100. When the control unit 101 executes the computer program 101*a*, the number of communication frames passing through the first processing unit 1041, second processing unit 1042 and third processing unit 1043 is counted and totalized.

In order to count the communication frames, the first processing unit 1041 comprises a counter 1041*a*, the second processing unit 1042 comprises a counter 1042*a*, and the third processing unit 1043 comprises a counter 1043*a*. The communication processing apparatus 100 comprises a database (DB) 105 for recording the totalized result of the communication frames counted by each of the processing units 1041, 1042, and 1043 when the control unit 101 executes the computer program 101*a*; and a timer unit 106 for measuring time.

Further, the communication processing apparatus 100 comprises a connection unit 107 for connecting the control unit 101 and an operating apparatus 200 to be operated by a maintenance person. When a request to transmit the totalized result is made from the operating apparatus 200 through the connection unit 107, the control unit 101 of the communication processing apparatus 100 transmits the totalized result to the operating apparatus 200.

FIG. 2 is a view showing the sequence of the totalizing process to be performed by the conventional communication processing apparatus 100 having the above-mentioned configuration. Note that the following processing is realized when the control unit 101 executes the computer program 101*a*.

The communication processing apparatus 100 causes the timer unit 106 to measure a predetermined time to be a cycle of a periodical totalizing process. Whenever the predetermined time has passed, the timer unit 106 outputs a predetermined signal to the control unit 101 (S1). The control unit 101 starts the periodical totalizing process upon receipt of the predetermined signal. First, the control unit 101 requests transmission of the count value of the communication frames counted by the counter 1041*a* of the first processing unit 1041 (S2). The control unit 101 collects the count value transmitted from the first processing unit 1041 based on this request (S3), and recodes the collected count value in the database 105 (S4). Next, the control unit 101 requests transmission of the count value of the communication frames counted by the counter 1042*a* of the second processing unit 1042 (S5). The control unit 101 collects the count value transmitted from the second processing unit 1042 based on this request (S6), and records the collected count value in the database 105 (S7). Further, the control unit 101 requests transmission of the count value of the communication frames counted by the counter 1043*a* of the third processing unit 1043 (S8). The control unit 101 collects the count value transmitted from the third processing unit 1043 based on this request (S9), and recodes the collected count value in the database 105 (S10).

When the communication processing apparatus 100 is requested by the operating apparatus 200 to transmit the totalized result (S11), the control unit 101 reads the result of totalizing the count values recorded in the database 105 (S12), and transmits the read totalized result to the operating apparatus 200 (S13).

In the conventional communication processing apparatus 100 explained using FIG. 1 and FIG. 2, however, since the time required for sequentially collecting the numbers of the communication frames counted by the counters 1041*a*, 1042*a*, and 1043*a* of the respective processing units is longer than the time required for sequentially processing the communication frames by the first processing unit 1041, the second processing unit 1042 and the third processing unit 1043, the totalized result in each of the processing units 1041, 1042 and 1043 may have errors.

FIG. 3 to FIG. 5 are conceptual views showing the state in which communication frames are passing through the respective processing units of the conventional communication processing apparatus. In FIG. 3 to FIG. 5, the components similar to those in FIG. 1 are designated with the same reference numerals as in FIG. 1.

In FIG. 3 to FIG. 5, reference numeral F denotes communication frames that pass through the first processing unit 1041, second processing unit 1042 and third processing unit 1043, and are subjected to the predetermined processing in each possessing unit. The communication frames F positioned in the counters 1041*a*, 1042*a* and 1043*a* represent the communication frames that already passed through the respective processing units and counted by the respective counters. On the other hand, the communication frames F positioned outside the counters represent the communication frames that have not yet been counted.

FIG. 3 shows the state in which the result counted by the counter 1041*a* of the first processing unit 1041 is collected. At this time, while the number of the communication frames that pass through the communication processing apparatus 100 is 6, one frame has been counted by the counter 1041*a*.

FIG. 4 shows the state of collecting the result counted by the counter 1042*a* of the second processing unit 1042 after Δt seconds from the time shown in FIG. 3. At this time, two frames have been counted by the counter 1042*a*. The reason why there is a difference between the counted result in the counter 1041*a* and the counted result in the counter 1042*a* is that the time required for the communication frames to pass through the first processing unit 1041 and the second processing unit 1042 is shorter than the time from a time at which the counted result in the counter 1041*a* is collected to a time at which the counted result in the counter 1042*a* is collected.

FIG. 5 shows the state of collecting the result counted by the counter 1043*a* of the third processing unit 1043 after more Δt seconds from the time shown in FIG. 4. At this time, three frames have been counted by the counter 1043*a*

Accordingly, since the counted results in the first processing unit 1041, second processing unit 1042, and third processing unit 1043 are different from each other, the result of totalizing the counted results may indicate as if the number of the communication frames has increased in the communication processing apparatus 100, and thus there is a problem of controversy in the totalized result. When the counted results are collected by temporarily interrupting the process of relaying the communication frames, this problem may be solved, but it is not easy to interrupt the process of the communication processing apparatus 100 in progress.

BRIEF SUMMARY OF THE INVENTION

The present invention has been made with the aim of solving the above problems, and it is a main object of the invention to provide a communication processing apparatus capable of accurately counting and reading communication frames while operating the communication processing apparatus. It is also an object of the invention to provide a totalizing system capable of totalizing the results of counting the frames read by such a communication processing apparatus.

In short, a communication processing apparatus capable of accurately counting the number of communication frames while processing the communication frames to be counted was realized by grouping and totalizing the communication frames, or by setting timings to be used as the basis for starting and finishing the counting of the communication frames.

A first aspect of the communication processing apparatus according to the invention is characterized by comprising: a receiving unit for receiving communication frames; a plurality of processing units for sequentially processing the communication frames received by the receiving unit; a transmitting unit for transmitting the communication frames sequentially processed by the plurality of processing units; means for appending group information indicating a group to the communication frames received by the receiving unit; changing means for changing group information to be appended to the communication frames on a predetermined cycle; means for counting the communication frames processed by each of the processing units separately for each group in each of the plurality of processing units; means for removing the group information from the communication frames to be transmitted from the transmitting unit; and means for collecting a count value counted separately for each group information appended to the communication frames in each of the plurality of processing units.

According to the first aspect of the communication processing apparatus of the invention, by grouping communication frames and counting the communication frames separately for each group, the communication frames that already passed through all the processing units are counted separately for each group, instead of counting the communication frames passing through the processing units. It is thus possible to accurately count and collect the number of the communication frames while operating the communication processing apparatus.

The first aspect of the communication processing apparatus according to the invention is further characterized in that the changing means appends group information while changing group information sequentially among three or more kinds of group information.

Further, according to the first aspect of the communication processing apparatus of the invention, by setting three or more groups for communication frames, it is possible to set two groups to be previous and next to the group to be changed, and one group to be collected. Therefore, since sufficient time can be given to adjust the timing for changing the group and the timing for collecting the count value, it is possible to perform accurate counting and collecting in which errors hardly occur.

A second aspect of the communication processing apparatus according to the invention is characterized by comprising: a receiving unit for receiving communication frames; a plurality of processing units for sequentially processing the communication frames received by the receiving unit; a transmitting unit for transmitting the communication frames sequentially processed by the plurality of processing units; means for inserting a reference frame capable of being processed by each of the plurality of processing units between the communication frames received by the receiving unit; means for counting the communication frames processed between two reference frames in each of the plurality of processing units; means for deleting the reference frames sequentially processed by the plurality of processing units; and means for collecting the counted count value in each of the plurality of processing units.

According to the second aspect of the communication processing apparatus of the invention, the number of communication frames processed between two reference frames inserted among communication frames at predetermined intervals is counted in each processing unit. It is thus possible to accurately count and collect the number of the communication frames while operating the communication processing apparatus.

A third aspect of the communication processing apparatus according to the invention is characterized by comprising: a receiving unit for receiving communication frames; a plurality of processing units for sequentially processing the communication frames received by the receiving unit; a transmitting unit for transmitting the communication frames sequentially processed by the plurality of processing units;

means for inserting a reference frame capable of being processed by each of the plurality of processing units between the communication frames received by the receiving unit; counting means for counting the communication frames processed between two reference frames in each of the plurality of processing units, where a plurality of the counting means are provided in each of the plurality of processing units; switching means, provided in each of the plurality of processing units, for switching the plurality of counting means so that any one of counting means counts the communication frames in each processing unit; means for deleting the reference frames sequentially processed by the plurality of processing units; and means for collecting the count value counted by the counting means in each of the plurality of processing units from counting means that finishes the counting by each of the plurality of processing units.

According to the third aspect of the communication processing apparatus of the invention, by counting the number of the communication frames processed between the reference frames in each processing unit, it is possible to synchronize the communication frames from which counting are started and the communication frames at which counting are finished in each processing unit. Accordingly, it becomes possible to exactly count the communication frames and to collect the communication frames under operating state of the communication processing apparatus. Also, each processing unit comprises a plurality of counting means. In each processing unit, counting means used for counting and counting means from which counted value is collected are switched. As a result, since margin is generated in timing adjustment between counting and collecting the counted value. It is thus possible to perform accurate counting and collecting in which errors hardly occur.

The second and third aspects of the communication processing apparatus according to the invention are further characterized in that the means for inserting a reference frame inserts the reference frame on a fixed cycle.

Further, according to the second and third aspects of the communication processing apparatus of the invention, since a reference frame is inserted among communication frames at fixed time intervals, it is possible to synchronize a communication frame from which counting is started in each of the processing units with a communication frame at which counting is finished. It is thus possible to perform accurate counting and collecting in which errors hardly occur.

A fourth aspect of the communication processing apparatus according to the invention is characterized by comprising: a receiving unit for receiving communication frames; a plurality of processing units for sequentially processing the communication frames received by the receiving unit; a transmitting unit for transmitting the communication frames sequentially processed by the plurality of processing units; means for generating a reference signal; means for transmitting the generated reference signal to each of the plurality of processing units in synchronism with a time at which the communication frames are processed in each of the plurality of processing units; means for counting the communication frames processed between two received reference frames in each of the plurality of processing units; and means for collecting the counted count value in each of the plurality of processing units.

According to the fourth aspect of the communication processing apparatus of the invention, since the number of communication frames processed between reference signals generated at predetermined intervals is counted in each processing unit, it is possible to synchronize a communication frame from which counting is started in each of the processing units with a communication frame at which counting is finished. It is thus possible to accurately count and collect the number of the communication frames while operating the communication processing apparatus.

The fourth aspect of the communication processing apparatus according to the invention is further characterized in that the means for transmitting a reference signal transmits the reference signal on a fixed cycle.

Further, according to the fourth aspect of the communication processing apparatus of the invention, since a reference pulse is inserted among communication frames at fixed time intervals, it is possible to synchronize a communication frame from which counting is started in each of the processing units with a communication frame at which counting is finished. It is thus possible to perform accurate counting and collecting in which errors hardly occur.

A totalizing system of the invention according to the invention is characterized by including the communication processing apparatus according to any one of the first through fourth aspects, and an operating apparatus connected to the communication processing apparatus; wherein the operating apparatus includes means for requesting transmission of a totalized result collected by the communication processing apparatus; and means for collecting the totalized result corresponding to the request from the communication processing apparatus.

According to the totalizing system of the invention, it is possible to collect the result totalized by the communication processing apparatus using the operating apparatus.

The above and further objects and features of the invention will more fully be apparent from the following detailed description with accompanying drawings.

BRIEF DESCRIPTION OF THE SEVERAL VIEWS OF THE DRAWINGS

FIG. 6 is a block diagram showing a configuration example of a communication processing apparatus according to Embodiment 1 of the invention;

FIG. 8 is a block diagram showing a configuration example of a control apparatus according to Embodiment 1 of the present invention;

FIG. 12 is a time chart showing the relationship among a group appended to communication frames when performing processing by the communication processing apparatus according to Embodiment 1 of the present invention, the count values in the respective counters, and the collected count values;

FIG. 21 is a view showing the sequence of the process of reading the count values by the communication processing apparatus according to Embodiment 3 of the present invention.

DETAILED DESCRIPTION OF THE PRESENT INVENTION

Figure 1:
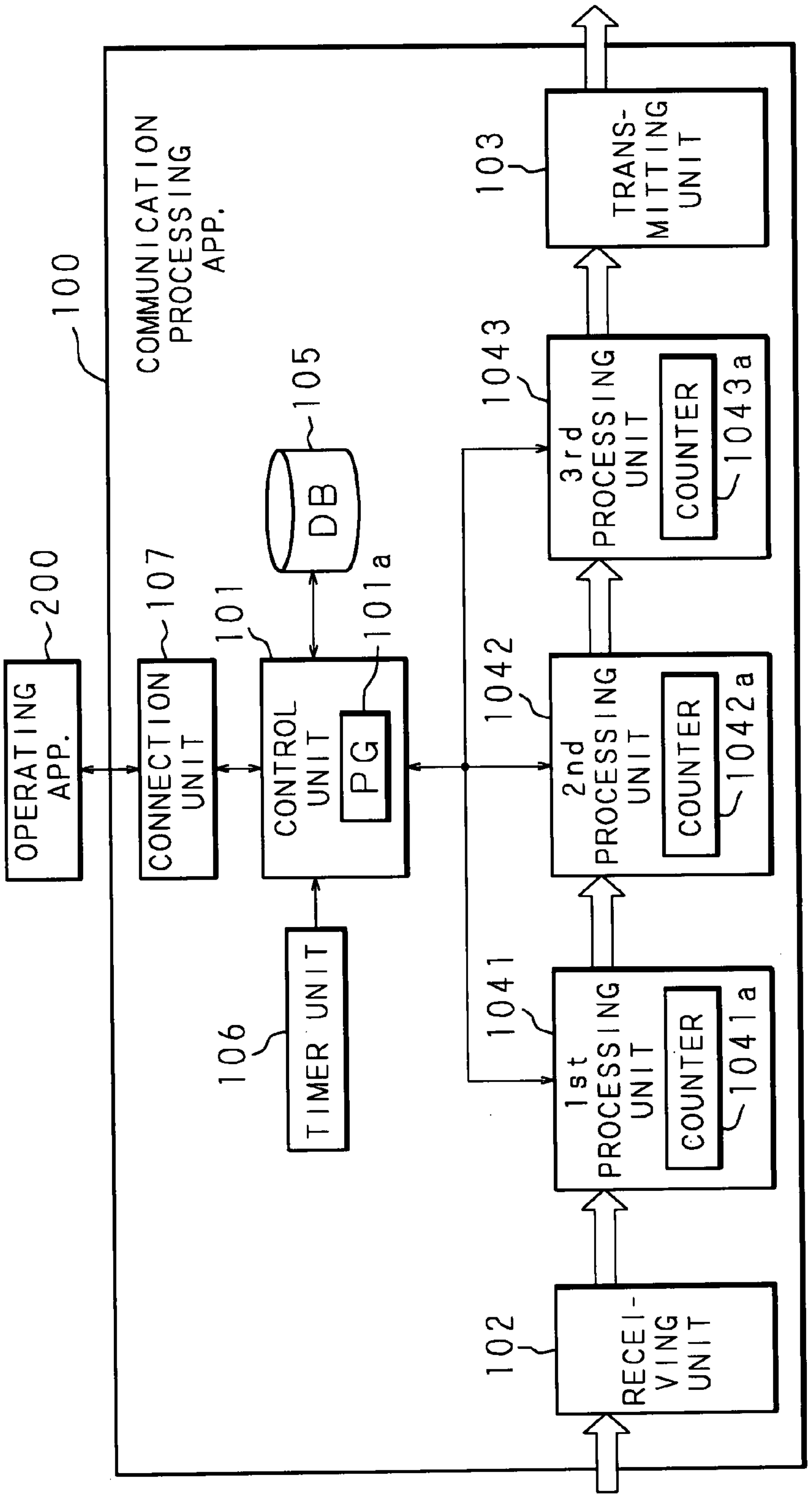
FIG. 1 is a block diagram showing a configuration example of a conventional communication processing apparatus.
Figure 2:
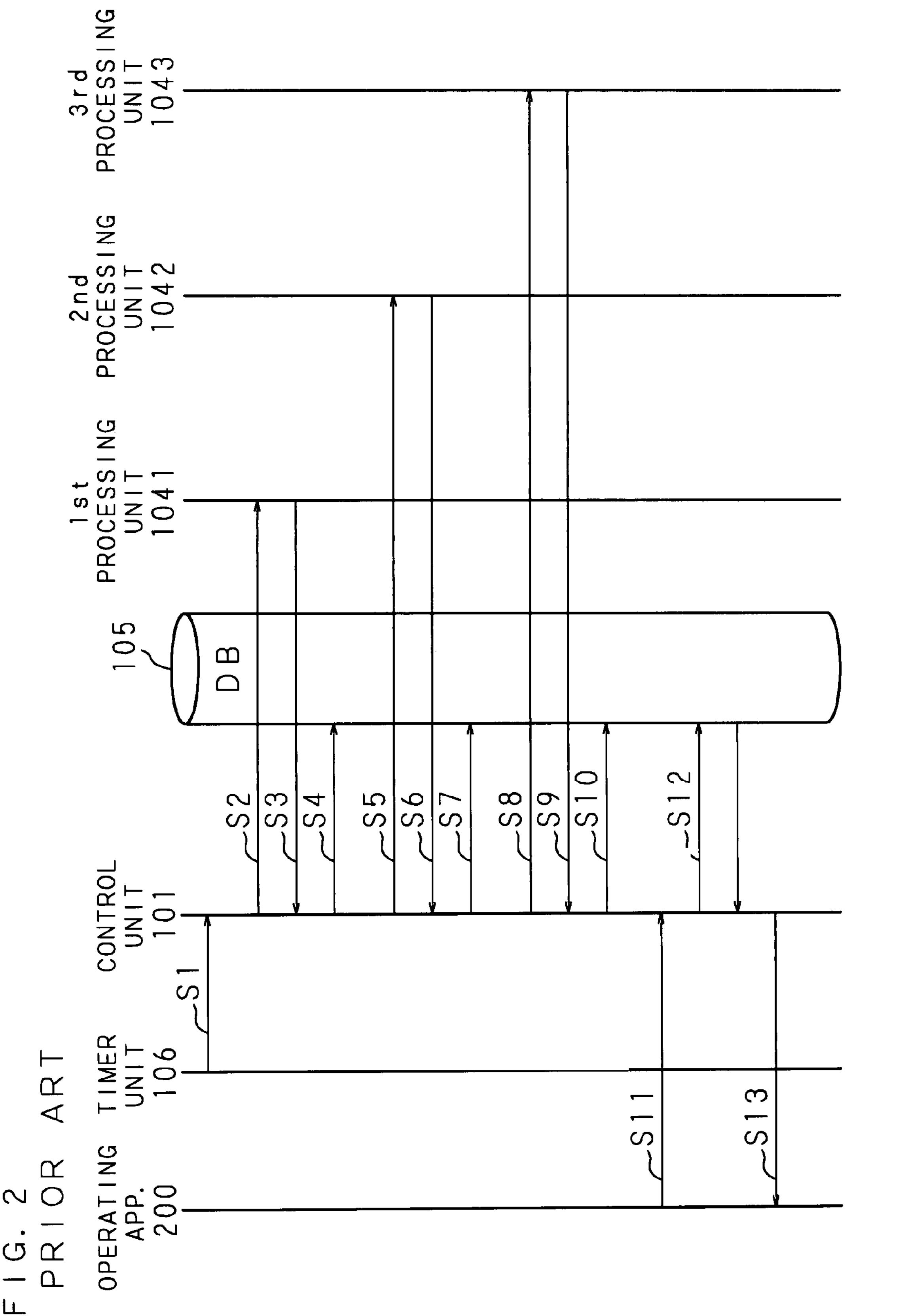
FIG. 2 is a view showing the sequence of a totalizing process of the conventional communication processing apparatus.
Figure 3:
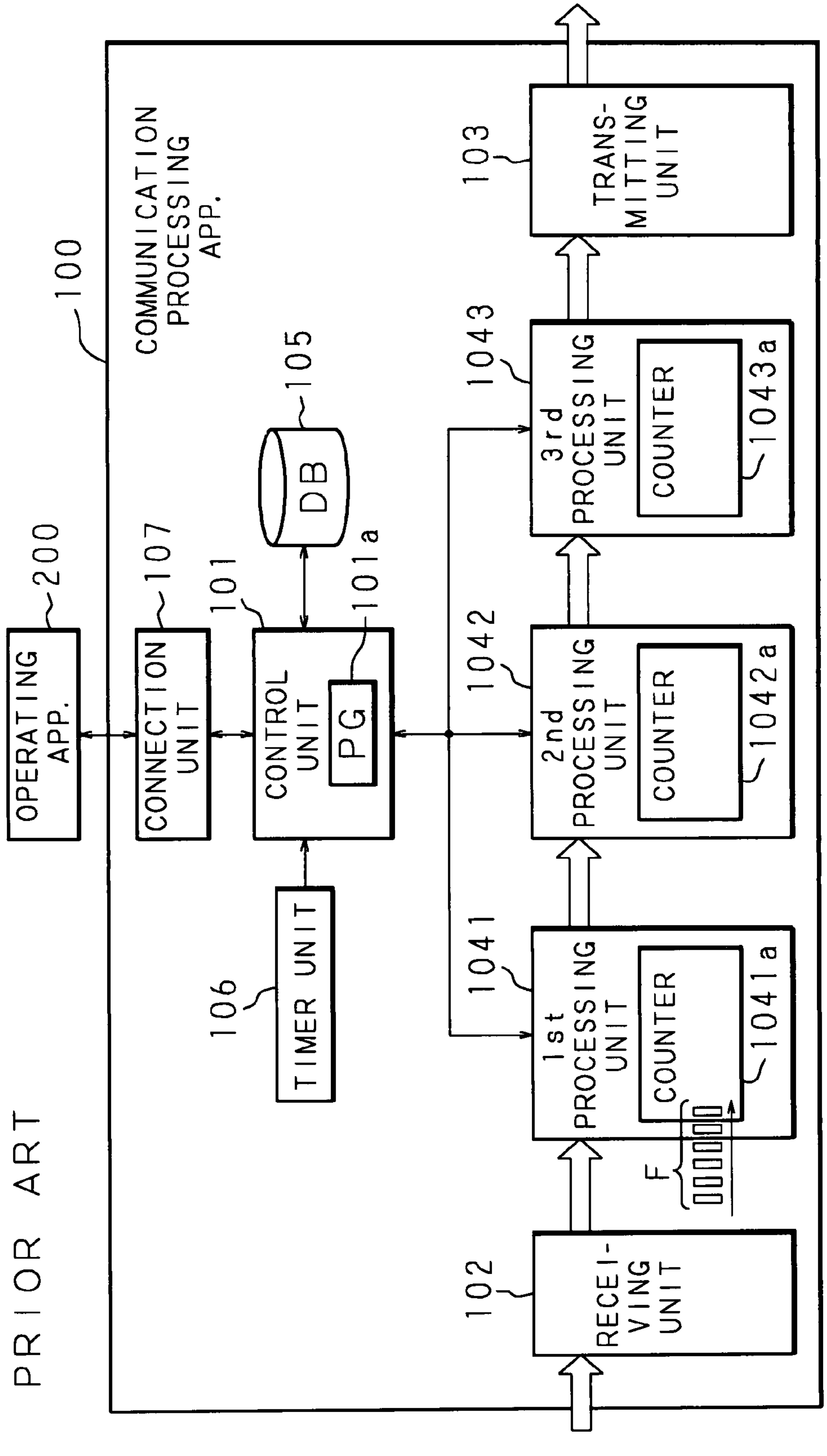
FIG. 3 is a conceptual view showing the state in which the communication frames are passing through the respective processing units of the conventional communication processing apparatus.
Figure 4:
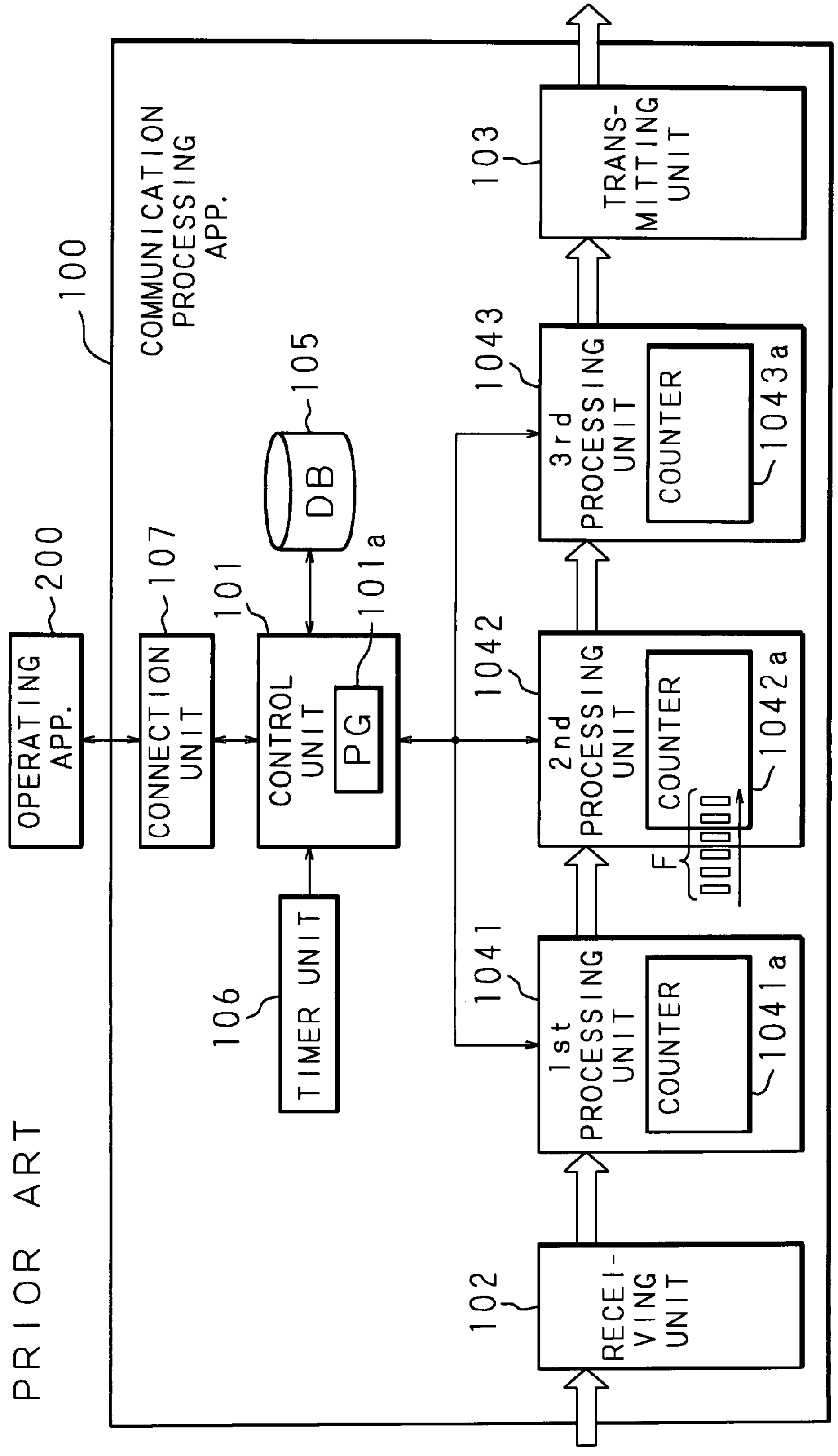
FIG. 4 is a conceptual view showing the state in which the communication frames are passing through the respective processing units of the conventional communication processing apparatus.
Figure 5:
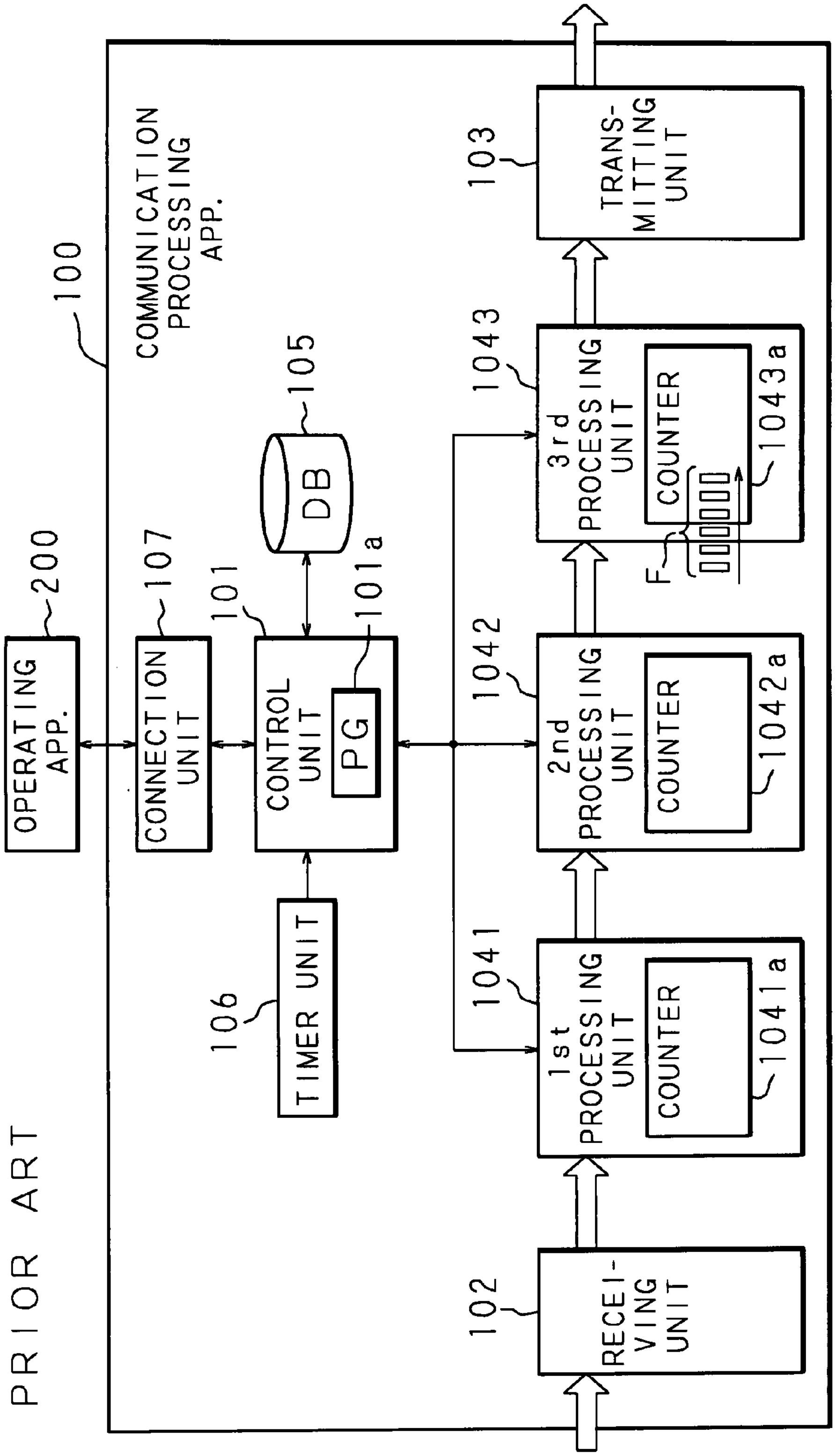
FIG. 5 is a conceptual view showing the state in which the communication frames are passing through the respective processing units of the conventional communication processing apparatus.

The following description will explain in detail the present invention, based on the drawings illustrating some embodiments thereof.

Embodiment 1

FIG. 6 is a block diagram showing a configuration example of a communication processing apparatus according to Embodiment 1 of the present invention.

In FIG. 6, reference numeral 10 denotes a communication processing apparatus of the present invention, and more specifically an apparatus such as a switch, a router, and the like for connecting communication networks (communication lines). The communication processing apparatus 10 comprises a control unit 11 using a CPU, MPU or the like for controlling the entire apparatus; a receiving unit 12, connected to a communication network, for receiving communication frames; and a transmitting unit 13, connected to a communication network, for transmitting the received communication frames. The communication frames received by the receiving unit 12 are processed by a first processing unit (first device) 141, a second processing unit (second device) 142 and a third processing unit (third device) 143, and then passed to the transmitting unit 13 and transmitted from the transmitting unit 103 to an external communication network.

The processing performed by the first processing unit 141, second processing unit 142 and third processing unit 143 is processing to realize functions to be fundamentally executed by the communication processing apparatus, such as a transfer function and a routing function. For example, the first processing unit 141 and third processing unit 143 perform processing related to a layer 1 (physical layer) in an OSI reference model, and the second processing unit 142 performs processing related to a layer 2 (data link layer).

A computer program (PG) 11*a* such as firmware is stored in the control unit 11 of the communication processing apparatus 10. When the control unit 11 executes the computer program 11*a*, the number of communication frames passing through the first processing unit 141, second processing unit 142 and third processing unit 143 is counted and totalized.

Further, the communication processing apparatus 10 comprises a database (DB) 15 for recording the result of totalizing the number of communication frames counted by each of the processing units 141, 142 and 143; a timer unit 16 for measuring time; and a connection unit 17 for connecting the control unit 11 and an operating apparatus 50 to be operated by a maintenance person. When a request to transmit the totalized result is made by the operating apparatus 50 through the connection unit 17, the control unit 11 of the communication processing apparatus 10 transmits the totalized result to the operating apparatus 50.

In the communication processing apparatus 10 of the present invention, in order to count the communication frames processed in each of the first processing unit 141, second processing unit 142 and third processing unit 143, group information representing a group is appended to the communication frames, and the number of the communication frames is counted separately for each of the appended group information. Therefore, the communication processing apparatus 10 of the present invention comprises a group information appending unit 18 for appending group information to the communication frames received by the receiving unit 12, and a group information removing unit 19 for removing the group information from the processed communication frames.

The communication frames appended with group information by the group information appending unit 18 are sent to the first processing unit 141, and then sent sequentially to the second processing unit 142 and the third processing unit 143. Moreover, the group information removing unit 19 removes the group information from the communication frames processed by the first processing unit 141, second processing unit 142 and third processing unit 143. The communication frame from which the group information is removed is passed to the transmitting unit 13 and transmitted from the transmitting unit 13 to the communication network.

The group indicated by the group information appended to the communication frames is an identifier appended to each communication frame to classify and count the received communication frames. Therefore, in each of the processing units 141, 142 and 143, the communication frames are classified according to a group indicated by the group information appended to each communication frame, and totalized separately for each group. Note that group information to be appended to the communication frames is changed at fixed time intervals. The following explanation is given based on an assumption that the communication frames are classified into three types, and the group information is changed to the first group, the second group, the third group, the first group . . . in this order in Embodiment 1.

The first processing unit 141 comprises a first counter 141*a* for counting communication frames appended with group information representing the first group, a second counter 141*b* for counting communication frames appended with group information representing the second group, and a third counter 141*c* for counting communication frames appended with group information representing the third group.

Similarly, the second processing unit 142 comprises a first counter 142*a* for counting communication frames appended with group information representing the first group, a second counter 142*b* for counting communication frames appended with group information representing the second group, and a third counter 142*c* for counting communication frames appended with group information representing the third group.

Further, the third processing unit 143 similarly comprises a first counter 143*a* for counting communication frames appended with group information representing the first group, a second counter 143*b* for counting communication frames appended with group information representing the second group, and a third counter 143*c* for counting communication frames appended with group information representing the third group.

Figure 7:
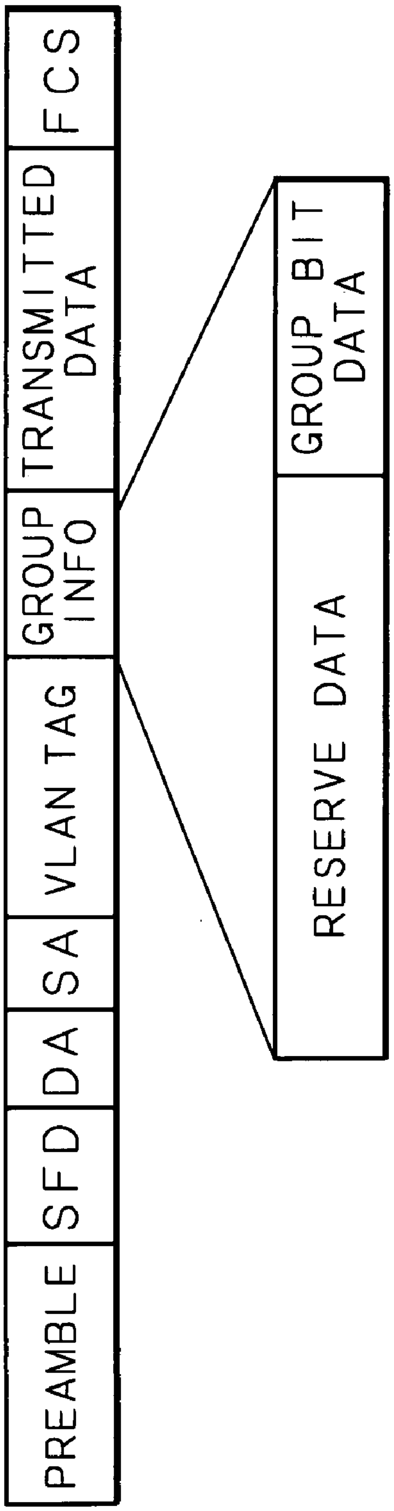
FIG. 7 is a schematic view showing a frame format of a communication frame to be processed by the communication processing apparatus according to Embodiment 1 of the present invention.

FIG. 7 is a schematic view showing a frame format of a communication frame to be processed by the communication processing apparatus 10 of Embodiment 1 of the present invention. In FIG. 7, a frame format conforming to the IEEE802.3 based on the Ethernet® standard is shown as an example of a frame format for relaying communication by the communication processing apparatus 10 of the present invention.

More specifically, a communication frame includes a preamble as a synchronizing pattern for bit synchronization, an SFD (Start Frame Delimiter) indicating the start of an effective frame, a DA as a destination address, an SA as a source address, a VLAN (Virtual Local Area Networks) tag, group information, transmitted data, and an FCS (Frame Check Sequence) for use in detecting errors. The group information includes reserve data and a 2-bit group bit data. By the group bit data, the group appended to the communication frame is indicated. More specifically, when the group bit data is [01], it indicates that the communication frame belongs to the first group; when the group bit data is [10], it indicates that the communication frame belongs to the second group; and when the group bit data is [11], it indicates that the communication frame belongs to the third group.

Therefore, as shown in FIG. 7, when the communication frames whose communication is relayed by the communication processing apparatus 10 has a frame format according to the IEEE802.3, it is possible to append group information to each communication frame by inserting the group information including the 2-bit group bit data into communication frames by the group information appending unit 18.

FIG. 8 is a block diagram showing a configuration example of the operating apparatus 50 according to Embodiment 1 of the present invention.

As the operating apparatus 50, it is possible to use a general-purpose computer, such as a personal computer. More specifically, the operating apparatus 50 comprises a control unit 51 using a CPU, etc.; a recording unit 52 using a hard disk, etc.; a storage unit 53 such as a RAM; a connection unit 54 for connecting to the communication processing apparatus 10; an input unit 55 such as a mouse and a keyboard; an output unit 56 such as a monitor, etc.

Next, the following description will explain processing to be executed by the communication processing apparatus according to Embodiment 1 of the present invention.

Figure 9:
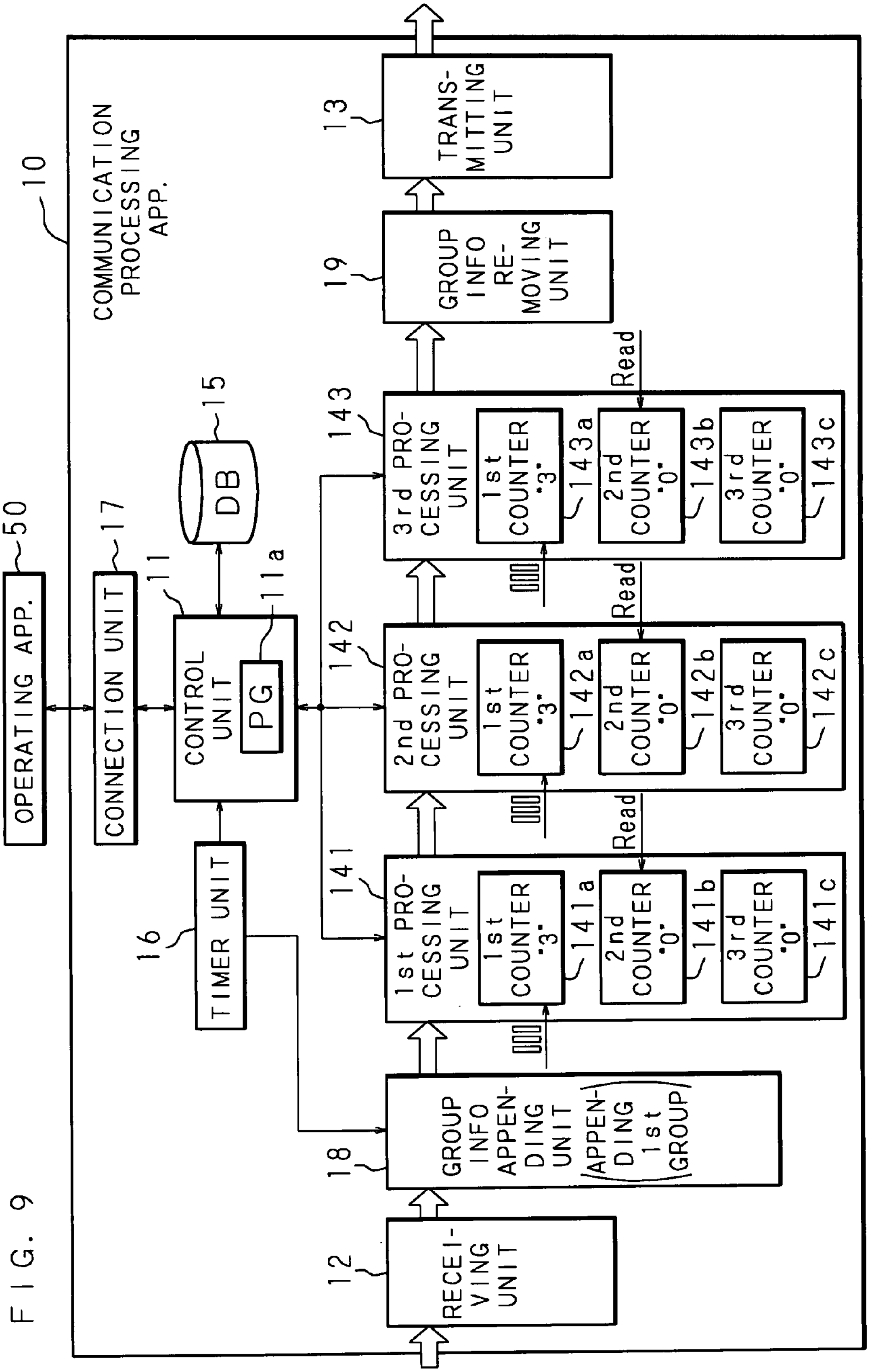
FIG. 9 is a conceptual view showing the state of counting communication frames by the communication processing apparatus according to Embodiment 1 of the present invention.
Figure 10:
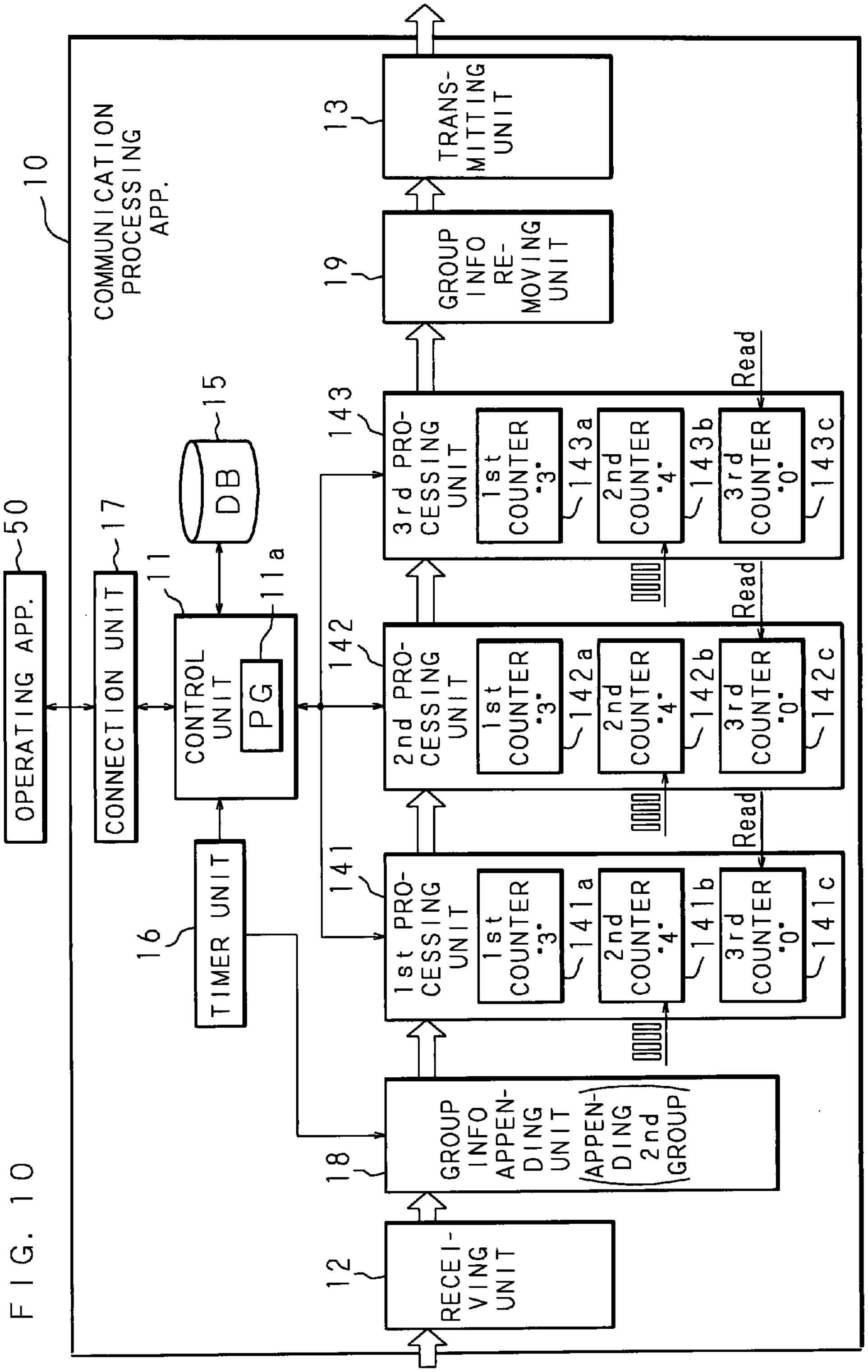
FIG. 10 is a conceptual view showing the state of counting communication frames by the communication processing apparatus according to Embodiment 1 of the present invention.
Figure 11:
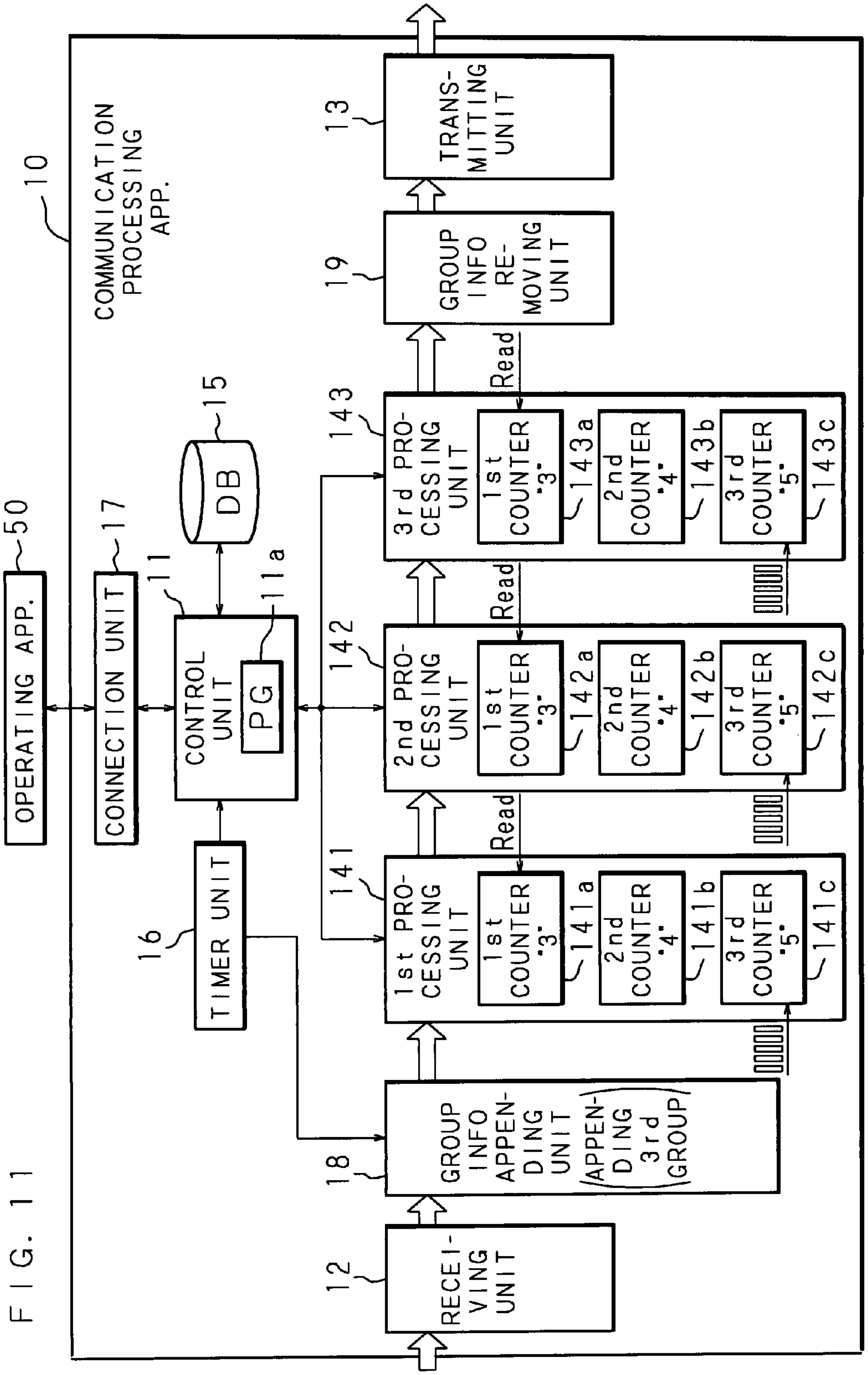
FIG. 11 is a conceptual view showing the state of counting communication frames by the communication processing apparatus according to Embodiment 1 of the present invention.

FIG. 9, FIG. 10 and FIG. 11 are conceptual views showing the state of counting communication frames by the communication processing apparatus 10 of Embodiment 1 of the present invention. In FIG. 9, FIG. 10 and FIG. 11, the numerical values indicated in the counters of the respective processing units 141, 142 and 143 indicate the number of communication frames counted by the respective counters. Moreover, reference numeral "Read" indicates a counter that is performing reading to collect the count value.

FIG. 9 shows the state in which three communication frames are received by the receiving unit 12, appended with group information representing the first group by the group information appending unit 18, and transmitted from the transmitting unit 13 via the first processing unit 141, second processing unit 142 and third processing unit 143 after removing the group information by the group information removing unit 19.

The first processing unit 141 accepts the communication frames, which were appended with group information by the group information appending unit 18, from the group information appending unit 18, counts up the number of the accepted communication frames by the first counter 141*a* corresponding to the first group, and passes the communication frames to the second processing unit 142 after performing predetermined processing on them. The second processing unit 142 accepts the communication frames from the first processing unit 141, counts up the number of the accepted communication frames by the first counter 142*a* corresponding to the first group, and passes the communication frames to the third processing unit 143 after performing predetermined processing on them. The third processing unit 143 accepts the communication frames from the second processing unit 142, counts up the number of the accepted communication frames by the first counter 143*a* corresponding to the first group, and passes the communication frames to the group information removing unit 19 after performing predetermined processing on them. Thus, after three communication frames are processed and transmitted from the transmitting unit 13, the count values of the first counter 141*a* of the first processing unit 141, the first counter 142*a* of the second processing unit 142, and the first counter 143*a* of the third processing unit 143 become all "3".

While the communication frames appended with the group information representing the first group are being processed as described above, by executing the computer program 11*a*, the control unit 11 collects (Read) the count values from the second counter 141*b* of the first processing unit 141, the second counter 142*b* of the second processing unit 142 and the second counter 143*b* of the third processing unit 143, each of which stores the count value of the communication frames of the second group, and records the collected count values in the database 15. In the stage shown in FIG. 9, the count values "0" are collected from the respective counters.

When a predetermined time, for example, one second, is measured since the group information appending unit 18 started to append the group information representing the first group, the timer unit 16 outputs a change instruction signal instructing to change the group information to the group information appending unit 18. When the group information appending unit 18 receives the change instruction signal, it changes the group information to be appended to the communication frames from the group information representing the first group to the group information representing the second group. The state after this change is shown in FIG. 10.

FIG. 10 shows the state in which four communication frames are received by the receiving unit 12, appended with group information representing the second group by the group information appending unit 18, and transmitted via the first processing unit 141, second processing unit 142 and third processing unit 143 from the transmitting unit 13 after removing the group information by the group information removing unit 19.

The first processing unit 141 accepts communication frames, which were appended with the group information by the group information appending unit 18, from the group information appending unit 18, counts up the number of the accepted communication frames by the second counter 141*b* corresponding to the second group, and passes the communication frames to the second processing unit 142 after performing predetermined processing on them. The second processing unit 142 accepts the communication frames from the first processing unit 141, counts up the number of the accepted communication frames by the second counter 142*b* corresponding to the second group, and passes the communication frames to the third processing unit 143 after performing predetermined processing on them. The third processing unit 143 accepts the communication frames from the second processing unit 142, counts up the number of the accepted communication frames by the second counter 143*b* corresponding to the second group, and passes the communication frames to the group information removing unit 19 after performing predetermined processing on them. Thus, after four communication frames are processed and transmitted from the transmitting unit 13, the count values of the second counter 141*b* of the first processing unit 141, the second counter 142*b* of the second processing unit 142, and the second counter 143*b* of the third processing unit 143 become all "4".

While the communication frames appended with the group information representing the second group are being processed as described above, by executing the computer program 11*a*, the control unit 11 collects the count values from the third counter 141*c* of the first processing unit 141, the third counter 142*c* of the second processing unit 142 and the third counter 143*c* of the third processing unit 143, each of which stores the count value of the communication frames of the third group, and records the collected count values in the database 15. In the stage shown in FIG. 10, the count value "0" is collected from each of the counters.

By setting the cycle of collecting the count value to be the same as the interval of changing group information (one second in Embodiment 1), it is possible to collect the count value whenever the group information to be appended to the respective communication frames by the group information appending unit 18 is changed, and it is also possible to switch the counter from which the count value is collected.

When a predetermined time, for example, one second, is measured since the group information appending unit 18 started to append the group information representing the second group, the timer unit 16 outputs a change instruction signal instructing to change the group information to the group information appending unit 18. When the group information appending unit 18 receives the change instruction signal, it changes group information to be appended to the communication frames from the group information representing the second group to the group information representing the third group. The state after this change is shown in FIG. 11.

FIG. 11 shows the state in which five communication frames are received by the receiving unit 12, appended with group information representing the third group by the group information appending unit 18, and transmitted via the first processing unit 141, second processing unit 142 and third processing unit 143 from the transmitting unit 13 after removing the group information by the group information removing unit 19.

The first processing unit 141 accepts the communication frames, which were appended with group information by the group information appending unit 18, from the group information appending unit 18, counts up the number of the accepted communication frames by the third counter 141*c* corresponding to the third group, and passes the communication frames to the second processing unit 142 after performing predetermined processing on them. The second processing unit 142 accepts the communication frames from the first processing unit 141, counts up the number of the accepted communication frames by the third counter 142*c* corresponding to the third group, and passes the communication frames to the third processing unit 143 after performing predetermined processing on them. The third processing unit 143 accepts the communication frames from the second processing unit 142, counts up the number of the accepted communication frames by the third counter 143*c* corresponding to the third group, and passes the communication frames to the group information removing unit 19 after performing predetermined processing on them. Thus, after five communication frames are processed and transmitted from the transmitting unit 13, the count values of the third counter 141*c* of the first processing unit 141, the third counter 142*c* of the second processing unit 142, and the third counter 143*c* of the third processing unit 143 become all "5".

While the communication frames appended with the group information representing the third group are being processed as described above, by executing the computer program 11*a*, the control unit 11 collects the count values from the first counter 141*a* of the first processing unit 141, the first counter 142*a* of the second processing unit 142, the first counter 143*a* of the third processing unit 143, each of which stores the count value of the communication frames of the first group, and records the collected count values in the database 15. In the stage shown in FIG. 11, the count value "3" is collected from each of the counters.

When a predetermined time, for example, one second, is measured since the group information appending unit 18 started to append the group information representing the third group, the timer unit 16 outputs a change instruction signal instructing to change the group information to the group information appending unit 18. When the group information appending unit 18 receives the change instruction signal, it changes group information to be appended to the communication frames from the group information representing the third group to the group information representing the first group. The above-described processing will be repeated thereafter.

FIG. 12 is a time chart showing the relationship among the group appended to the communication frames, the count values in the respective counters, and the collected count values, when the communication processing apparatus 10 of Embodiment 1 of the present invention performs processing.

More specifically, the time chart shown in FIG. 12 indicates, from the upper side to the lower side, the group to be appended to the communication frames, the count value of the first counter, the count value of the second counter, the count value of the third counter, and the collected count value of an arbitrary processing unit. Also, FIG. 12 corresponds to the states shown in FIG. 9 through FIG. 11, and shows changes in the group, the count values of the counters and the collected count value with time.

During a period in which the group information representing the first group is appended to the communication frames shown in FIG. 9, the communication processing apparatus 10 relays three communication frames. In this case, the count value of each of the first counters corresponding to the first group becomes “3”. In this stage, the count value of each of the second counters and each of the third counters is “0”. At the same time, the count value is collected from each of the third counters, and the collected count value is “0”.

During a period in which the group information representing the second group is appended to the communication frames shown in FIG. 10, the communication processing apparatus 10 relays four communication frames. In this case, the count value of each of the second counters corresponding to the second group becomes “4”. In this stage, the count value of each of the first counters is “3” and the count value of each of the third counters is “0”. At the same time, the count value is collected from each of the third counters, and the collected count value is “0”.

During a period in which the group information representing the third group is appended to the communication frames shown in FIG. 11, the communication processing apparatus 10 relays five communication frames. In this case, the count value of each of the third counters corresponding to the third group becomes “5”. In this stage, the count value of each of the second counter is “4”. At the same time, the count value is collected from each of the first counters, and the collected count value is “3”. Then, after collecting the count value of each of the first counters, the count values of the respective first counters are initialized to “0”.

Thereafter, the period returns to the period of appending the group information representing the first group to the communication frames, and, in the example shown in FIG. 12, two communication frames are relayed. Thus, the count value of each of the first counters corresponding to the first group becomes “2”. In this stage, the count value of each of the third counters is “5”. At the same time, the count value is collected from each of the second counters, and the collected count value is “4”. Then, after collecting the count value of each of the second counters, the count values of the respective second counters are initialized to “0”.

As shown in FIG. 9 through FIG. 11 and FIG. 12, in the communication processing apparatus 10 of Embodiment 1 of the present invention, the group information is appended to the received communication frames, and the communication frames processed in the respective processing units are totalized separately for each group. One millisecond or so is required to collect the count values of the communication frames. However, the time in which one kind of group information continues to be appended to the communication frames is set to a predetermined time, for example, one second or so. Thus, since the communication frames which have passed through all the processing units can be counted separately for each group, it is possible to accurately count the number of the processed communication frames and collect the count value while operating the communication processing apparatus 10. Moreover, collecting of the count values is performed at a predetermined time interval equal to the interval of changing group information. In addition, while appending one kind of group information to the communication frames, the count values are collected from the counters corresponding to the group information previously appended to the communication frames. Therefore, it is possible to ensure sufficient time to collect the count values before the communication frames are counted next time by the same counters.

Figure 13:
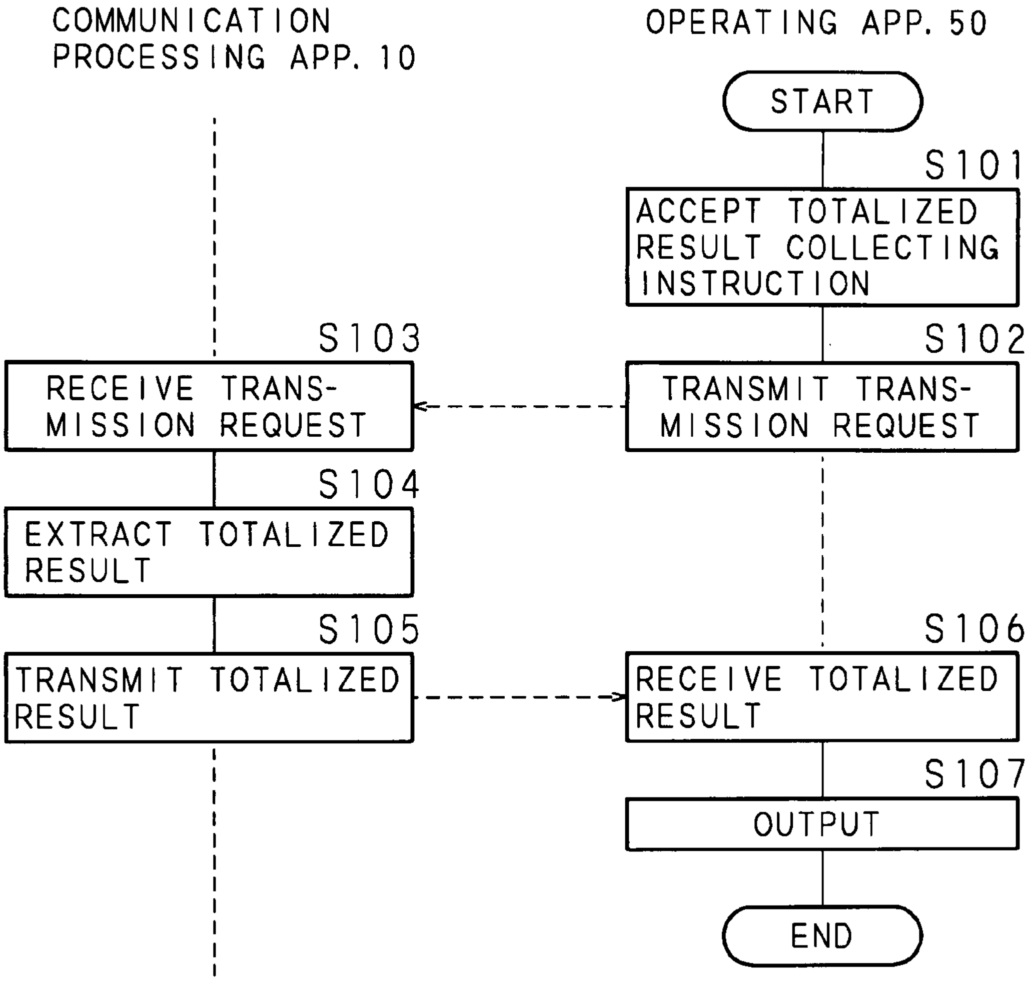
FIG. 13 is a flowchart showing a procedure of the collecting process of the totalized result performed by a totalizing system according to Embodiment 1 of the present invention.

FIG. 13 is a flowchart showing a procedure of the collecting process of the totalized result performed by a totalizing system according to Embodiment 1 of the present invention. Note that the totalizing system of the present invention includes the above-mentioned communication processing apparatus 10 and operating apparatus 50. Needless to say, the communication processing apparatus 10 performs the following processing under the control of the control unit 11 by executing the computer program 11*a*, and the operating apparatus 50 performs the following processing under the control of the control unit 51 by executing a predetermined program.

The maintenance person who operates the operating apparatus 50 inputs an instruction to collect the totalized result by operating the input unit 55. The operating apparatus 50 accepts the totalized result collecting instruction from the input unit 55 (S101), and transmits from the connection unit 54 to the communication processing apparatus 10 a transmission request to request transmission of the totalized result based on the collected count values (S102).

The control unit 11 of the communication processing apparatus 10 receives the transmission request from the operating apparatus 50 by the connection unit 17 (S103), extracts from the database 15 the totalized result corresponding to the transmission request, based on the received transmission request (S104), and transmits the extracted totalized result from the connection unit 17 to the operating apparatus 50 (S105). The totalized result extracted from the database 15 in the process at step S104 is the totalized result such as the result of totalizing the count values counted separately for each group by each processing unit.

The control unit 51 of the operating apparatus 50 receives the totalized result from the communication processing apparatus 10 by the connection unit 54 (S106), and outputs to the output unit 56, for example, displayed as a list, after performing processing if necessary (S107).

The processing by the communication processing apparatus 10 of Embodiment 1 of the present invention and the process of totalizing the processing results by the operating apparatus 50 are performed in the manner described above.

Embodiment 1 described above illustrates a mode in which the group (more specifically, the group information representing a group) to be appended to communication frames is switched at predetermined time intervals. However, the present invention is not limited to this, and it may be possible to change group information to be appended to the communication frames whenever a predetermined number of communication frames are processed. In this case, since it is possible to determine the upper limit of the count value of the counter of each processing unit to the above-mentioned predetermined number, it is not necessary to use counters having performance more than needed.

Embodiment 2

The following description will explain Embodiment 2 of the present invention. While Embodiment 1 described above adopts a configuration for totalizing the number of communication frames based on the appended group information, Embodiment 2 of the present invention adopts a configuration for totalizing the number of communication frames by inserting a reference frame to be counting basis between communication frames to be counted.

Figure 14:
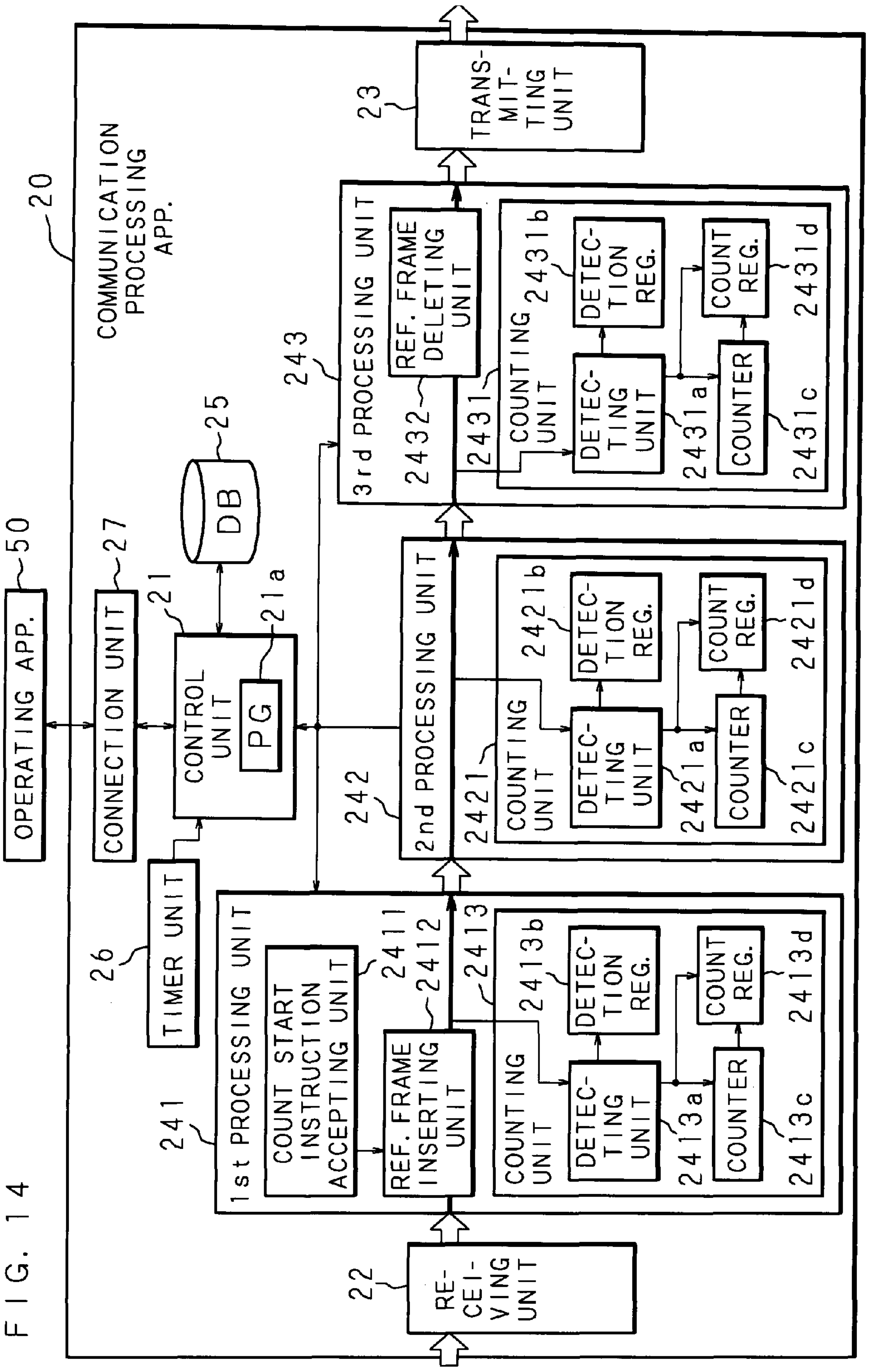
FIG. 14 is a block diagram showing a configuration example of a communication processing apparatus according to Embodiment 2 of the present invention.

FIG. 14 is a block diagram showing a configuration example of a communication processing apparatus according to Embodiment 2 of the present invention.

In FIG. 14, reference numeral 20 denotes a communication processing apparatus of the present invention, and more specifically an apparatus such as a switch and a router for connecting communication networks (communication lines) similar to the communication processing apparatus 10 of Embodiment 1. The communication processing apparatus 20 comprises a control unit 21 storing a computer program 21*a*; a receiving unit 22; a transmitting unit 23; a first processing unit 241; a second processing unit 242; a third processing unit 243; a database 25; a timer unit 26; a connection unit 27, and the like. Note that the communication processing apparatus 20 is connected to an operating apparatus 50 through the connection unit 27. Here, since the configuration of the operating apparatus 50 is the same as that in Embodiment 1 described above, the explanation thereof is omitted by referring to Embodiment 1.

The communication processing apparatus 20 outputs a count start instruction from the control unit 21 to the first processing unit 241 on a predetermined cycle, for example, a one-second cycle, based on the result of measuring time by the timer unit 26. The first processing unit 241 comprises a count start instruction accepting unit 2411 for accepting the count start instruction, and a reference frame inserting unit 2412. The count start instruction accepting unit 2411 outputs a reference frame insertion instruction signal to the reference frame inserting unit 2412, based on the count start instruction accepted from the control unit 21.

The reference frame inserting unit 2412 has a function for accepting the communication frames passed from the receiving unit 22 to the first processing unit 241. After the communication frames accepted by the reference frame inserting unit 2412 is processed by the first processing unit 241, they are passed to the second processing unit 242. At the same time, when the count start instruction is received from the count start instruction accepting unit 2411, the reference frame inserting unit 2412 inserts the reference frame to be the counting basis between the communication frames passed sequentially from the receiving unit 22, and causes the first processing unit 241 to perform processing. The reference frame is passed to the second processing unit 242 in the same manner as the communication frames passed from the first processing unit 241 to the second processing unit 242. Note that the reference frame is composed of a predetermined bit pattern, for example, "01111110", that has no fear of being misconceived as a communication frame.

The first processing unit 241 comprises a counting unit 2413 for counting communication frames. The counting unit 2413 comprises a detecting unit 2413*a* for detecting acceptance of the reference frame and the communication frame by the first processing unit 241; a detection register 2413*b* for accepting a signal outputted from the detecting unit 2413*a*; a counter 2413*c*; and a count register 2413*d*. When the detecting unit 2413*a* detects the reference frame, it outputs a reference detection notification signal to the detection register 2413*b*, counter 2413*c*, and count register 2413*d*. When the detecting unit 2413*a* detects the communication frame, it outputs a count signal to the counter 2413*c*.

When the detection register 2413*b* accepts the reference detection notification signal from the detecting unit 2413*a*, it sets a flag (more specifically, stores "1") indicating that the reference frame was detected. The flag set in the detection register 2413*b* is monitored by the control unit 21.

When the counter 2413*c* accepts the count signal from the detecting unit 2413*a*, it counts up. When the counter 2413 *c* accepts the reference detection notification signal, it loads the count value at that time into the count register 2413*d*, and returns its count value to the initial value (resets the count value to "0"). Thus, the counter 2413*c* counts the number of times the count signal was outputted from the detecting unit 2413*a* after receiving the reference detection notification signal. Since the count signal is outputted when the detecting unit 2413*a* accepts the communication frame, the count value of the counter 2413*c* is the number of communication frames processed by the first processing unit 241.

The count register 2413*d* stores the count value loaded from the counter 2413*c* at the timing of accepting the count signal from the detecting unit 2413*a*. Therefore, the count value stored in the count register 2413*d* becomes the number of communication frames processed by the first processing unit 241 while two reference frames were detected. The count value stored in the count register 2413*d* is collected by the control unit 21 by executing the computer program 21*a*.

The second processing unit 242 comprises a counting unit 2421 for counting communication frames. The counting unit 2421 comprises a detecting unit 2421*a* for detecting acceptance of the reference frame and the communication frame by the second processing unit 242; a detection register 2421*b* for accepting a signal outputted from the detecting unit 2421*a*; a counter 2421*c*; and a count register 2421*d*. When the detecting unit 2421*a* detects the reference frame, it outputs a reference detection notification signal to the detection register 2421*b*, counter 2421*c*, and count register 2421*d*. When the detecting unit 2421*a* detects the communication frame, it outputs a count signal to the counter 2421*c*.

When the detection register 2421*b* accepts the reference detection notification signal from the detecting unit 2421*a*, it sets a flag indicating that the reference frame was detected. The flag set in the detection register 2421*b* is monitored by the control unit 21.

When the counter 2421*c* accepts the count signal from the detecting unit 2421*a*, it counts up. When the counter 2421*c* accepts the reference detection notification signal, it loads the count value at that time into the count register 2421*d*, and returns its count value to the initial value. Thus, the counter 2421*c* counts the number of times the count signal was outputted from the detecting unit 2421*a* after the reference detection notification signal was accepted. Since the count signal is outputted when the detecting unit 2421*a* accepts a communication frame, the count value of the counter 2421*c* is the number of communication frames processed by the second processing unit 242.

The count register 2421*d* stores the count value loaded from the counter 2421*c* at the timing of accepting the count signal from the detecting unit 2421*a*. Therefore, the count value stored in the count register 2421*d* becomes the number of communication frames processed by the second processing unit 242 while two reference frames were detected. The count value stored in the count register 2421*d* is collected by the control unit 21 by executing the computer program 21*a*.

The third processing unit 243 comprises a counting unit 2431 for counting the communication frames, and a reference frame deleting unit 2432 for deleting the reference frame among the communication frames. The counting unit 2431 comprises a detecting unit 2431*a* for detecting acceptance of the reference frame and the communication frame by the third processing unit 243; a detection register 2431*b* for accepting a signal outputted from the detecting unit 2431*a*; a counter 2431*c*, and a count register 2431*d*. When the detecting unit 2431*a* detects the reference frame, it outputs a reference detection notification signal to the detection register 2431$b$, counter 2431$c$, and count register 2431$d$. When the detecting unit 2431$a$ detects the communication frame, it outputs a count signal to the counter 2431$c$.

When the detecting unit 2431$a$ detects the reference frame, the reference frame deleting unit 2432 deletes the detected reference frame, and passes only the communication frames to the transmitting unit 23. Here, “only the communication frames” means frames other than the reference frame if the reference frame is inserted among communication frames as in Embodiment 2 of the present invention. Therefore, for example, if information, such as a signal and a frame other than the reference frame used in Embodiment 2 of the present invention, is inserted among communication frames, it is passed to the transmitting unit 23 together with the communication frames if necessary.

When the detection register 2431$b$ accepts the reference detection notification signal from the detecting unit 2431$a$, it sets a flag indicating that the reference frame was detected. The flag set in the detection register 2431$b$ is monitored by the control unit 21.

When the counter 2431$c$ accepts the count signal from the detecting unit 2431$a$, it counts up. When the counter 2421$c$ accepts the reference detection notification signal, it loads the count value at that time into the count register 2431$d$, and returns its count value to the initial value.

The count register 2431$d$ stores the count value loaded from the counter 2431$c$ at the timing of accepting the count signal from the detecting unit 2431$a$. Therefore, the count value stored in the count register 2431$d$ becomes the number of communication frames processed by the third processing unit 243 while two reference frames were detected. The count value stored in the count register 2431$d$ is collected by the control unit 21 by executing the computer program 21$a$.

Figure 15:
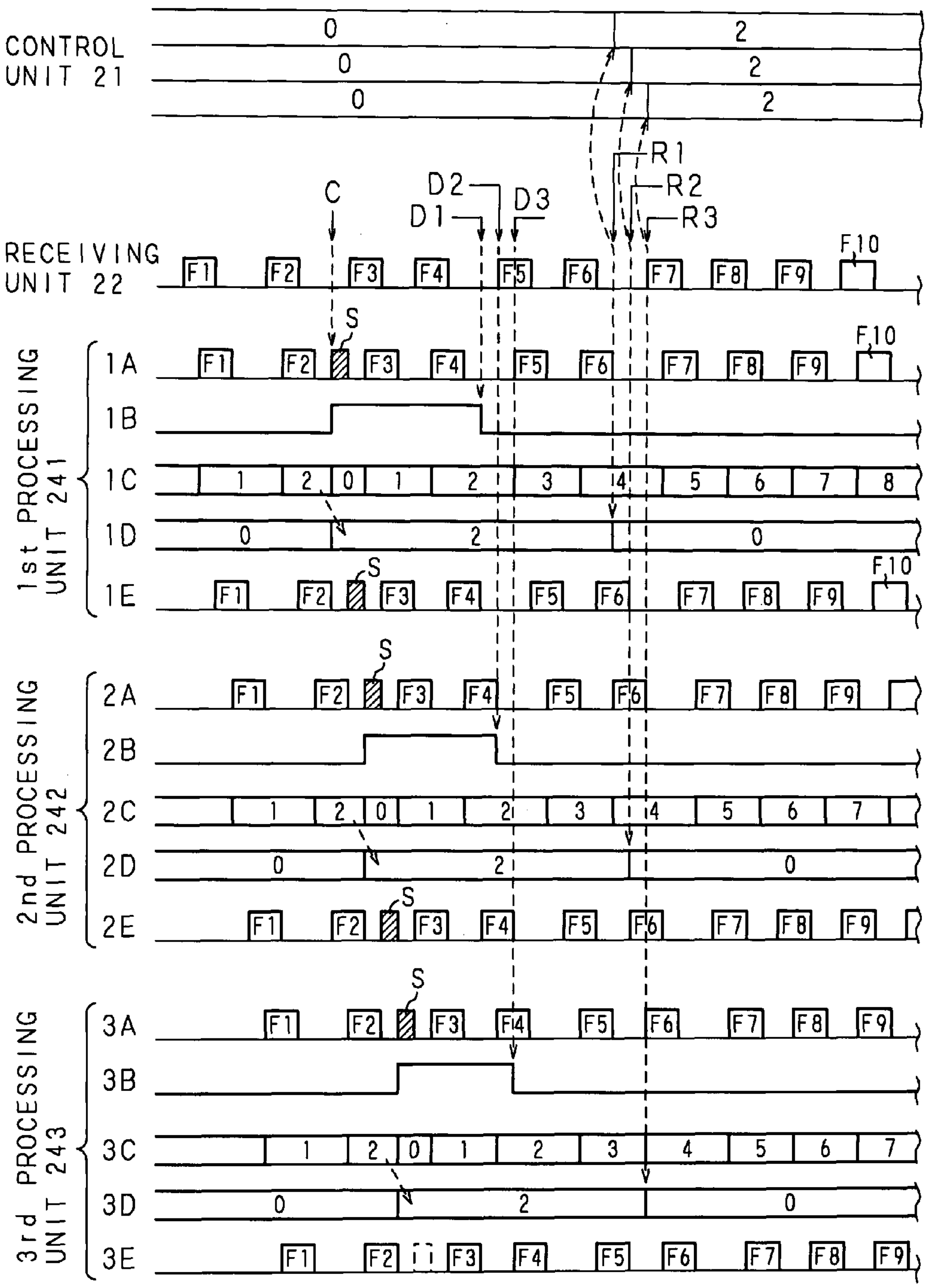
FIG. 15 is a timing chart showing the steps of the counting process to be executed by the communication processing apparatus according to Embodiment 2 of the present invention.
Figure 16:
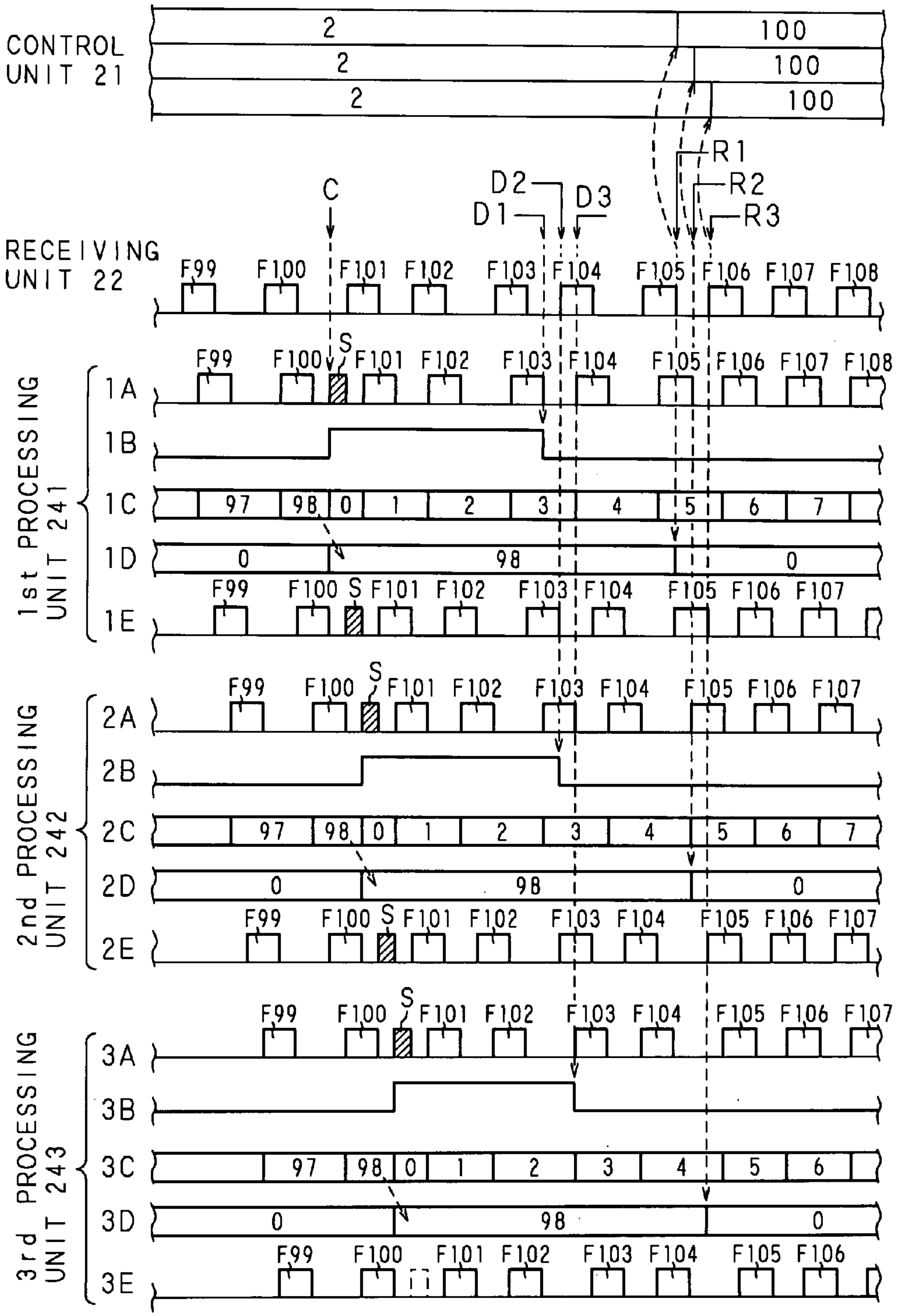
FIG. 16 is a timing chart showing the steps of the counting process to be executed by the communication processing apparatus according to Embodiment 2 of the present invention.

FIG. 15 and FIG. 16 are timing charts showing the steps of the counting process performed by the communication processing apparatus 20 of Embodiment 2 of the present invention. Here, FIG. 15 shows mainly a timing chart at the time of collecting the count value for the first time after starting the counting process, and FIG. 16 shows mainly a timing chart at the time of collecting the count value for the second time after elapse of a predetermined cycle from the state shown in FIG. 15. More specifically, the timing charts shown in FIG. 15 and FIG. 16 indicate timings of various kinds of processes related to the control unit 21, receiving unit 22, first processing unit 241, second processing unit 242, and third processing unit 243 in time sequence from the upper side to the lower side.

The timing related to the control unit 21 includes timings of various kinds of processes to be executed by the control unit 21 when the computer program 21$a$ is executed, based on the result of measuring time by the timer unit 26. Moreover, in FIG. 15 and FIG. 16, the count values collected from the processing units 241, 242 and 243 and recorded in the database 25 by the control unit 21 are shown separately for each processing unit. Note that count values shown as the count values recorded by the control unit 21 in FIG. 15 and FIG. 16 correspond, from the upper side downward, to the count value collected from the first processing unit 241, the count value collected from the second processing unit 242, and the count value collected from the third processing unit 243.

As the timing related to the receiving unit 22, the communication frame receiving timing is shown.

The timing related to the first processing unit 241 includes timings related to the communication frame accepted and reference frame inserted through the reference frame inserting unit 2412 (1A), the flag in the detection register 2413$b$ (1B), the count value of the counter 2413$c$ (1C), the value of the count register 2413$d$ (1D), and the communication frame and reference frame outputted to the second processing unit 242 (1E).

The timing related to the second processing unit 242 includes timings related to the communication frame and reference frame accepted from the first processing unit 241 (2A), the flag in the detection register 2421$b$ (2B), the count value of the counter 2421$c$ (2C), the value of the count register 2421$d$ (2D), and the communication frame and reference frame outputted to the third processing unit 243 (2E).

The timing related to the third processing unit 243 includes timings related to the communication frame and reference frame accepted from the second processing unit 242 (3A), the flag in the detection register 2431$b$ (3B), the count value of the counter 2431$c$ (3C), the value of the count register 2431$d$ (3D), and the communication frame and reference frame passed to the transmitting unit 23 (3E).

As shown in FIG. 15 and FIG. 16, the receiving unit 22 receives the communication frames indicated by reference numerals F1, F2, . . . , and outputs the received communication frames to the first processing unit 241 through the reference frame inserting unit 2412. Further, inputted to the first processing unit 241 are not only the communication frames, but also the reference frame indicated by reference numeral S and inserted between two communication frames by the reference frame inserting unit 2412 based on a count start instruction (C) outputted on a fixed cycle (for example, at one-second intervals) from the control unit 21. Based upon the reference frame S, more specifically, when the detecting unit 2413$a$ detects the reference frame S, the flag is set in the detection register 2413$b$. Moreover, the count value of the counter 2413$c$ is stored in the count register 2413$d$ based on the reference frame S, and the count value of the counter 2413$c$ is returned to the initial value.

FIG. 15 shows a state in which the count value “2” of the communication frames counted by the counter 2413$c$ is stored in the count register 2413$d$. On the other hand, FIG. 16 shows a state in which the count value “98” of the communication frames counted by the counter 2413$c$ is stored in the count register 2413$d$.

The communication frames and reference frame S passed through the first processing unit 241 in the manner described above are outputted to the second processing unit 242.

When performing the processing by the first processing unit 241 as described above, the control unit 21 detects the detection of the reference frame S with reference to the content (flag) of the detection register 2413$b$ (D1). Accordingly, the control unit 21 initializes the detection register 2413$b$, that is, resets the flag (more specifically, stores “0”), reads the count value (the count value at the time the detection register 2413$b$ is initialized) stored in the count register 2413$d$ (R1), and records the read count value in the database 25.

At the timing shown as R1 in FIG. 15, the control unit 21 reads the count value “2”, and records “2” in the database 25. At the timing shown as R1 in FIG. 16, the control unit 21 reads the count value “98”, and records “100” by adding the value “2” recorded in the database 25. After reading the count value in the count register at the timing R1, the control unit 21 initializes the count register 2413$d$, that is, resets the flag (more specifically, sets “0”).

The second processing unit 242 accepts the communication frames and reference frame S from the first processing unit 241, and sets the flag in the detection register 2421$b$, based on the reference frame S, more specifically, at the time the detecting unit 2421$a$ detects the reference frame S. Moreover, the count value of the counter 2421$c$ is stored in the count register 2413$d$ based on the reference frame S, and the count value of the counter 2421$c$ is returned to the initial value.

The communication frames and reference frame S passed through the second processing unit 242 as described above are outputted to the third processing unit 243.

When performing the processing by the second processing unit 242 as described above, the control unit 21 detects the detection of the reference frame S with reference to the content (flag) of the detection register 2421$b$ (D2). Accordingly, the control unit 21 initializes the detection register 2421$b$, reads the count value (the count value at the time the detection register 2421$b$ is initialized) stored in the count register 2421$d$ (R2), and records the read count value in the database 25. The count register 2421$d$ is initialized after reading the count value.

The third processing unit 243 accepts the communication frames and reference frame S from the second processing unit 242, and sets the flag in the detection register 2431$b$, based on the reference frame S, more specifically, at the time the detecting unit 2431$a$ detects the reference frame S. Moreover, the count value of the counter 2431$c$ is stored in the count register 2431$d$ based on the reference frame S, and the count value of the counter 2431$c$ is returned to the initial value. Thereafter, the third processing unit 243 deletes the reference frame S by the reference frame deleting unit 2432, and outputs only the communication frames to the transmitting unit 23.

When performing the processing by the third processing unit 243 as described above, the control unit 21 detects the detection of the reference frame S with reference to the content (flag) of the detection register 2431$b$ (D3). Accordingly, the control unit 21 initializes the detection register 2431$b$, reads the count value (the count value at the time the detection register 2431$b$ is initialized) stored in the count register 2431$d$ (R3), and records the read count value in the database 25. The count register 2431$d$ is initialized after reading the count value.

Figure 17:
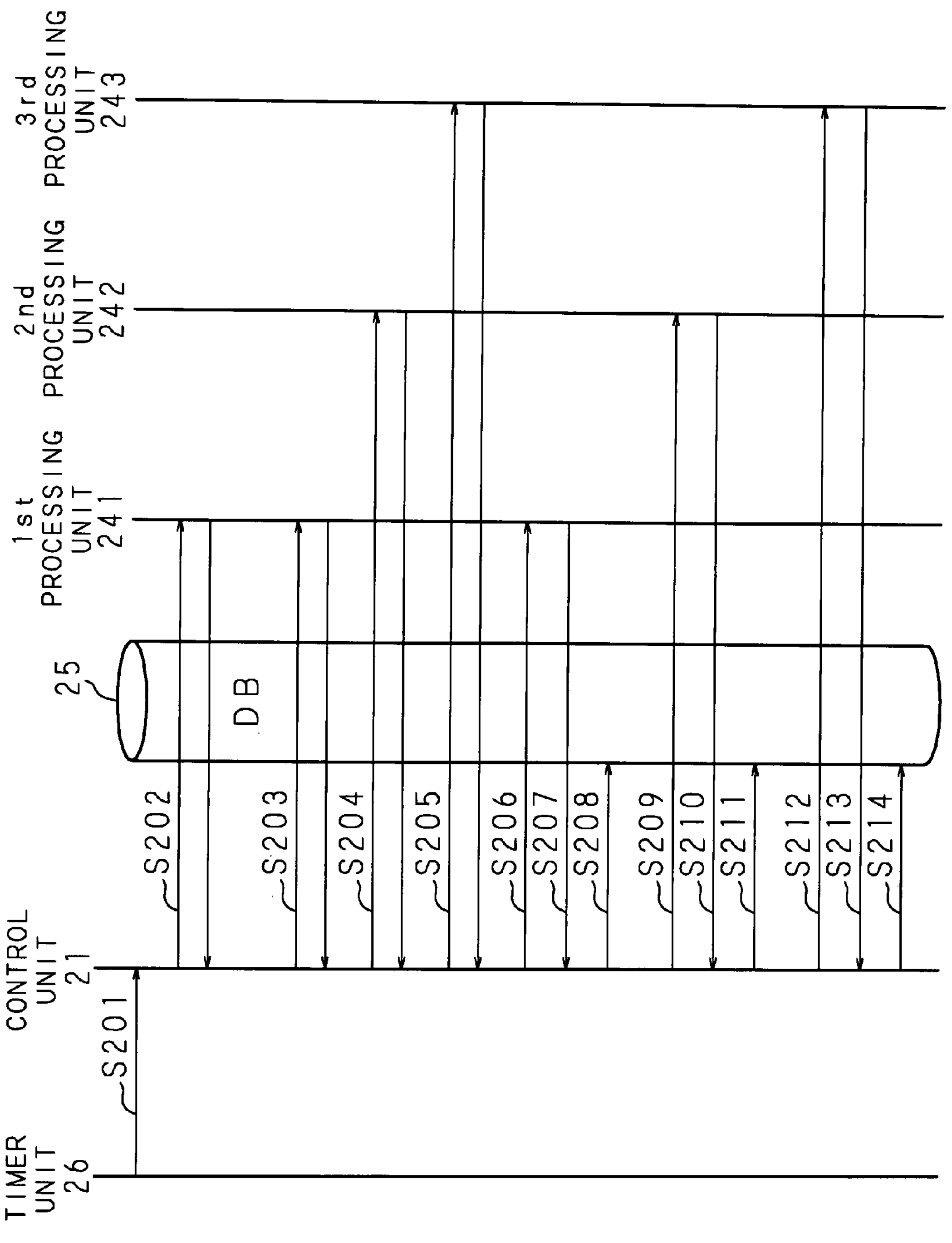
FIG. 17 is a view showing the sequence of the process of reading the count values by the communication processing apparatus according to Embodiment 2 of the present invention.

FIG. 17 is a view showing a sequence of the collecting process of the count value performed by the communication processing apparatus 20 of Embodiment 2 of the present invention. Note that the following processing is realized by executing the computer program 21$a$ by the control unit 21.

The communication processing apparatus 20 causes the timer unit 26 to measure a predetermined time to be a cycle of a periodical totalizing process. Whenever the predetermined time passes, the timer unit 26 outputs a predetermined signal to the control unit 21 (S201). The control unit 21 starts the periodical totalizing process upon acceptance of the predetermined signal. First, the control unit 21 outputs a count start instruction to the count start instruction accepting unit 2411 of the first processing unit 241 so as to insert the reference frame S among the communication frames (S202).

Next, the control unit 21 detects the detection of the reference frame S with reference to the content (flag) of the detection register 2413$b$ of the first processing unit 241 (S203), detects the detection of the reference frame S with reference to the content (flag) of the detection register 2421$b$ of the second processing unit 242 (S204), and further detects the detection of the reference frame S with reference to the detection register 2431$b$ of the third processing unit 243 (S205).

Then, the control unit 21 requests transmission of the count value stored in the count register 2413$d$ of the first processing unit 241 (S206). The control unit 21 collects the count value transmitted from the first processing unit 241 based on this request (S207), and records the collected count value in the database 25 (S208). Next, the control unit 21 requests transmission of the count value stored in the count register 2421$d$ of the second processing unit 242 (S209). The control unit 21 collects the count value transmitted from the second processing unit 242 based on this request (S210), and records the collected count value in the database 25 (S211). Further, the control unit 21 requests transmission of the count value stored in the count register 2431$d$ of the third processing unit 243 (S212). The control unit 21 collects the count value transmitted from the third processing unit 243 based on this request (S213), and records the collected count value in the database 25 (S214).

Since the steps of the process of collecting the totalized result of the totalizing system of Embodiment 2 for collecting the totalized result from the communication processing apparatus 20 by operating the operating apparatus 50 are the same as in Embodiment 1, the explanation thereof is omitted by referring to Embodiment 1.

As shown in FIG. 15, FIG. 16 and FIG. 17, in the communication processing apparatus according to Embodiment 2 of the present invention, by inserting a reference frame S among the communication frames processed by each of the processing units, at predetermined intervals of one second or so, the number of the communication frames processed while two reference frames S were detected in each processing unit is counted, and thus it is possible to accurately count the number of the communication frames separately for each processing unit and collect the count value.

The processing by the communication processing apparatus 20 of Embodiment 2 of the present invention and the process of totalizing the processing results by the operating apparatus 50 are performed in the manner described above.

Embodiment 3

The following description will explain Embodiment 3 of the present invention. Although Embodiment 2 described above adopts a configuration for totalizing the number of communication frames by inserting a reference frame among communication frames, Embodiment 3 of the present invention adopts a configuration for performing totalizing the number of communication frames by inserting a reference pulse among communication frames to be counted.

Figure 18:
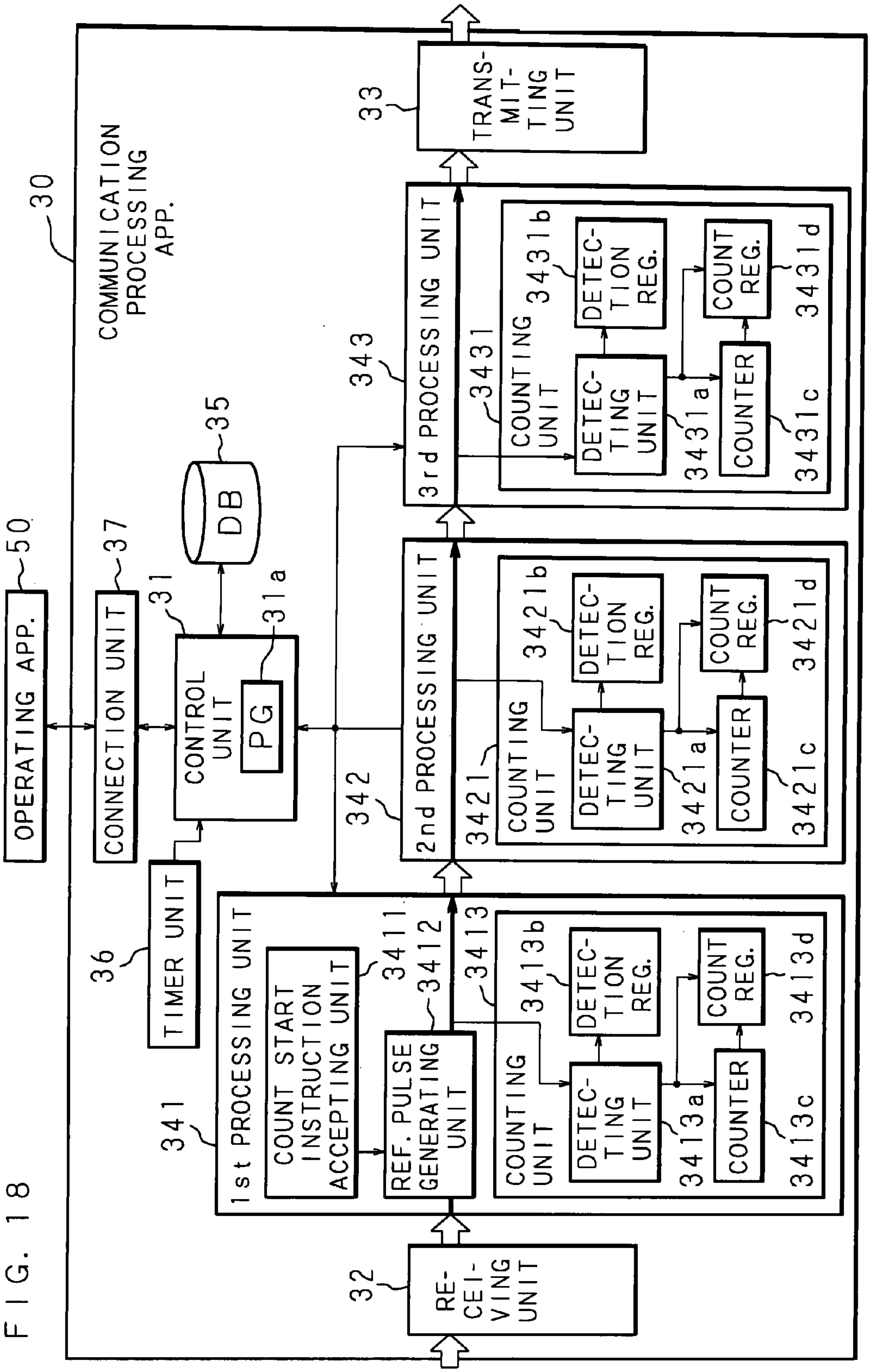
FIG. 18 is a block diagram showing a configuration example of a communication processing apparatus according to Embodiment 3 of the present invention.

FIG. 18 is a block diagram showing a configuration example of a communication processing apparatus according to Embodiment 3 of the present invention.

In FIG. 18, reference numeral 30 denotes a communication processing apparatus of the present invention, and more specifically an apparatus, such as a switch and a router for connecting communication networks (communication lines), similar to the communication processing apparatuses 10 and 20 of Embodiments 1 and 2. The communication processing apparatus 30 comprises a control unit 31 storing a computer program 31$a$; a receiving unit 32; a transmitting unit 33; a first processing unit 341; a second processing unit 342; a third processing unit 343; a database 35; a timer unit 36; and a connection unit 37. Note that the communication processing apparatus 30 is connected to an operating apparatus 50 through the connection unit 37. Here, since the configuration of the operating apparatus 50 is the same as that in Embodiments 1 and 2 described above, the explanation thereof is omitted by referring to Embodiment 1 or 2.

The communication processing apparatus 30 outputs a count start instruction from the control unit 31 to the first processing unit 341 on a predetermined cycle, for example, a one-second cycle, based on the result of measuring time by the timer unit 36. The first processing unit 341 comprises a count start instruction accepting unit 3411 for accepting the count start instruction. The count start instruction accepting unit 3411 outputs a reference pulse generation instruction signal to a reference pulse generating unit 3412, based on the count start instruction accepted from the control unit 31.

The reference pulse generating unit 3412 has a function for receiving the communication frames sent from the receiving unit 32 to the first processing unit 341. After the communication frames accepted by the reference pulse generating unit 3412 is processed by the first processing unit 341, they are passed to the second processing unit 342. At the same time, when the count start instruction is accepted from the count start instruction accepting unit 3411, the reference pulse generating unit 3412 generates a reference pulse (a reference signal) to be the counting basis. The reference pulse thus generated is transmitted to the second processing unit 342 and third processing unit 343 in synchronous with the period of processing the communication frames, or so that the reference pulse is inserted between the communication frames. For the path of the reference pulse transmitted from the first processing unit 341 to the second processing unit 342 and third processing unit 343, a bus for transferring the communication frames is used in Embodiment 3, but it may be possible to separately provide a bus for the reference pulse.

The first processing unit 341 comprises a counting unit 3413 for counting communication frames. The counting unit 3413 comprises a detecting unit 3413*a* for detecting execution of processing related to the reference pulse and communication frames by the first processing unit 341; a detection register 3413*b* for accepting a signal outputted from the detecting unit 3413*a*; a counter 3413*c*; and a count register 3413*d*. When the detecting unit 3413*a* detects the reference pulse, it outputs a reference detection notification signal to the detection register 3413*b*, counter 3413*c*, and count register 3413*d*. When the detecting unit 3413*a* detects the communication frame, it outputs a count signal to the counter 3413*c*.

When the detection register 3413*b* accepts the reference detection notification signal from the detecting unit 3413*a*, it sets a flag indicating that the reference pulse was detected (more specifically, stores "1"). The flag set in the detection register 3413*b* is monitored by the control unit 31.

When the counter 3413*c* accepts the count signal from the detecting unit 3413*a*, it counts up. When the counter 3413*c* accepts the reference detection notification signal, it loads the count value at that time into the count register 3413*d*, and returns its count value to the initial value (resets the count to "0"). Thus, the counter 3413*c* counts the number of times the count signal was outputted from the detecting unit 3413*a* after the reference detection notification signal was accepted. Since the count signal is outputted when the detecting unit 3413*a* accepts the communication frame, the count value of the counter 3413*c* is the number of communication frames processed by the first processing unit 341.

The count register 3413*d* stores the count value loaded from the counter 3413*c* at the timing of accepting the count signal from the detecting unit 3413*a*. Thus, the count value stored in the count register 3413*d* becomes the number of communication frames processed by the first processing unit 341 while two reference pulses were detected. The count value stored in the count register 3413*d* is collected by the control unit 31 by executing the computer program 31*a*.

The second processing unit 342 comprises a counting unit 3421 for counting communication frames. The counting unit 3421 comprises a detecting unit 3421*a* for detecting acceptance of the reference pulse and the communication frame by the second processing unit 342; a detection register 3421*b* for accepting a signal outputted from the detecting unit 3421*a*; a counter 3421*c*; and a count register 3421*d*. When the detecting unit 3421*a* detects the reference pulse, it outputs the reference detection notification signal to the detection register 3421*b*, counter 3421*c*, and count register 3421*d*. When the detecting unit 3421*a* detects the communication frame, it outputs a count signal to the counter 3421*c*.

When the detection register 3421*b* accepts the reference detection notification signal from the detecting unit 3421*a*, it sets a flag indicating that the reference pulse was detected. The flag set in the detection register 3421*b* is monitored by the control unit 31.

When the counter 3421*c* accepts the count signal from the detecting unit 3421*a*, it counts up. When the counter 3421*c* accepts the reference detection notification signal, it loads the count value at that time into the count register 3421*d*, and returns its count value to the initial value.

Thus, the counter 3421*c* counts the number of times the count signal was outputted from the detecting unit 3421*a* after the reference detection notification signal was accepted. Since the count signal is outputted when the detecting unit 3421*a* accepts the communication frame, the count value of the counter 3421*c* is the number of communication frames processed by the second processing unit 342.

The count register 3421*d* stores the count value loaded from the counter 3421*c* at the timing of accepting the count signal from the detecting unit 3421*a*. Thus, the count value stored in the count register 3421*d* becomes the number of communication frames processed by the second processing unit 342 while two reference pulses were detected. The count value stored in the count register 3421*d* is collected by the control unit 31 by executing the computer program 31*a*.

The third processing unit 343 comprises a counting unit 3431 for counting communication frames. The counting unit 3431 comprises a detecting unit 3431*a* for detecting acceptance of the reference pulse and the communication frame by the third processing unit 343; a detection register 3431*b* for accepting a signal outputted from the detecting unit 3431*a*; a counter 3431*c*; and a count register 3431*d*. When the detecting unit 3431*a* detects the reference pulse, it outputs a reference detection notification signal to the detection register 3431*b*, counter 3431*c*, and count register 3431*d*. When the detecting unit 3431*a* detects the communication frame, it outputs a count signal to the counter 3431*c*.

Then, the third processing unit 343 passes the communication frame to the transmitting unit 33. Since the reference pulse is a signal transmitted from the first processing unit 341 to the second processing unit 342 and third processing unit 343 and is not a frame, it is not transmitted to the transmitting unit 33 and external communication networks.

When the detection register 3431*b* accepts the reference detection notification signal from the detecting unit 3431*a*, it sets a flag indicating that the reference pulse was detected. The flag set in the detection register 3431*b* is monitored by the control unit 31.

When the counter 3431*c* accepts the count signal from the detecting unit 3431*a*, it counts up. When the counter 3431*c* accepts the reference detection notification signal, it loads the count value at that time into the count register 3431*d*, and returns its count value to the initial value. Thus, the counter 3431*c* counts the number of times the count signal was outputted from the detecting unit 3431*a* after the reference detection notification signal was accepted. Since the count signal is outputted when the detecting unit 3431*a* accepts the communication frame, the count value of the counter 3431*c* is the number of communication frames processed by the third processing unit 343.

The count register 3431*d* stores the count value loaded from the counter 3431*c* at the timing of accepting the count signal from the detecting unit 3431*a*. Thus, the count value stored in the count register 3431*d* becomes the number of communication frames processed by the third processing unit 343 while two reference pulses were detected. The count value stored in the count register 3431*d* is collected by the control unit 31 by executing the computer program 31*a*.

Figure 19:
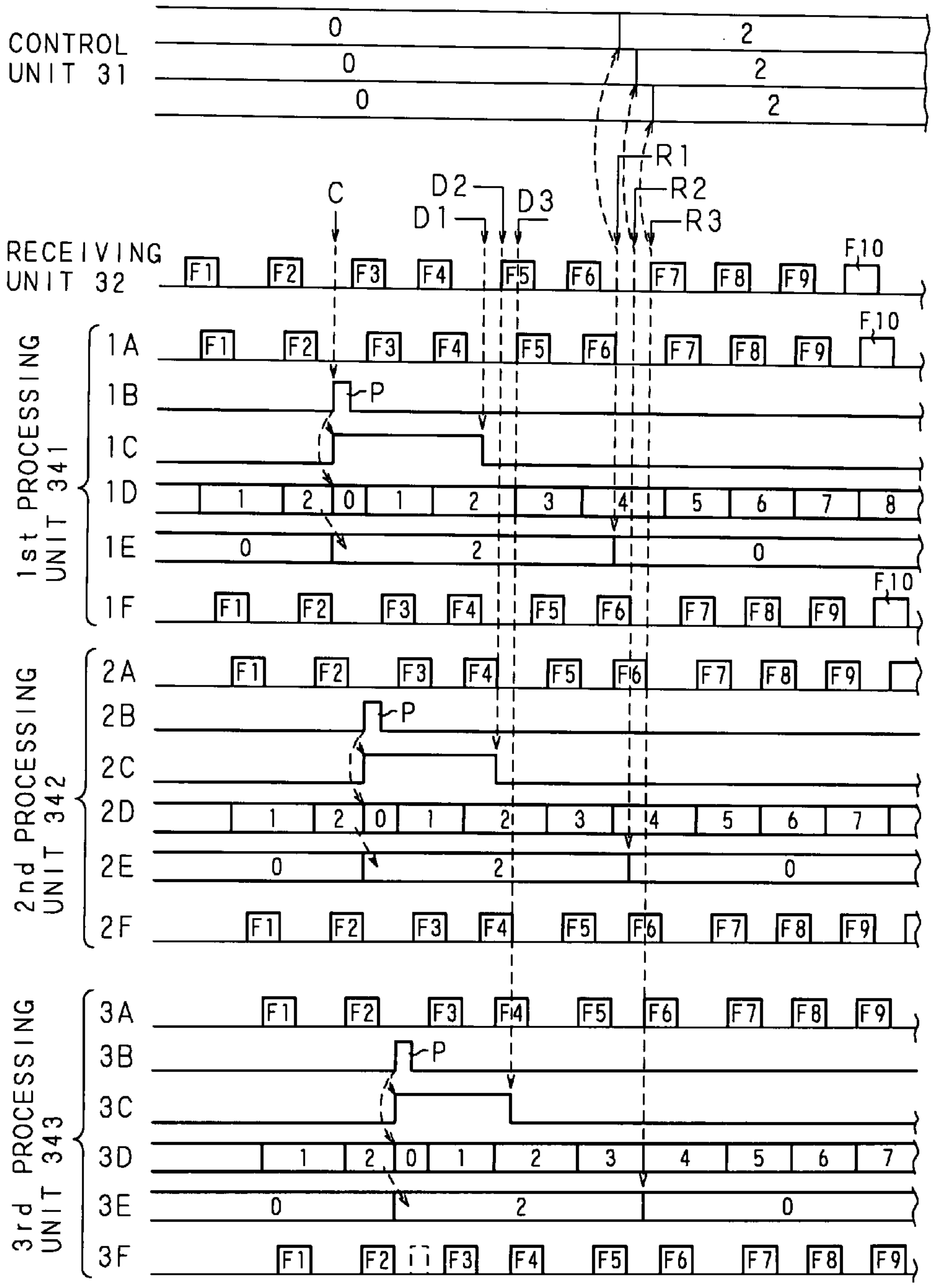
FIG. 19 is a timing chart showing the steps of the counting process to be executed by the communication processing apparatus according to Embodiment 3 of the present invention.
Figure 20:
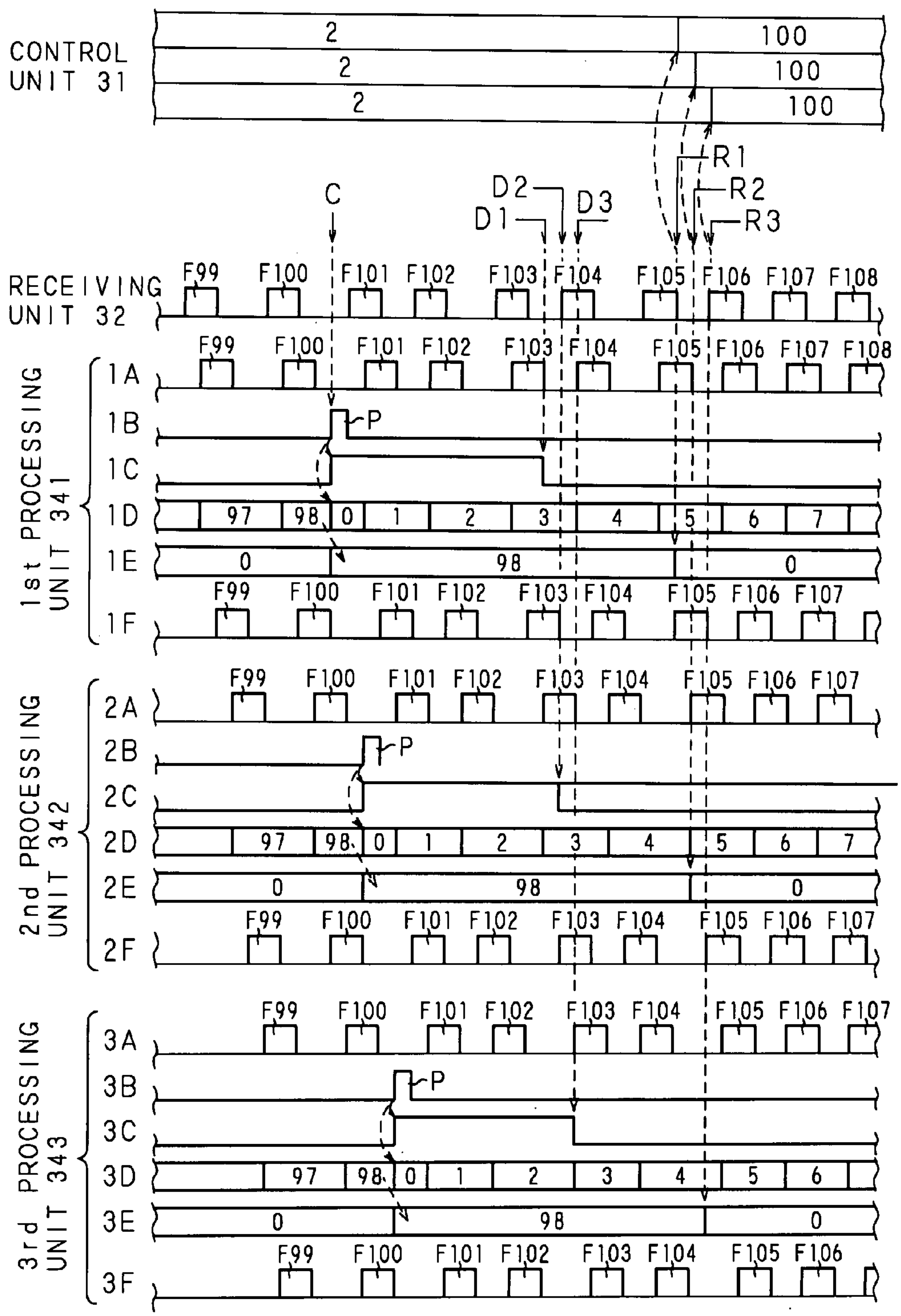
FIG. 20 is a timing chart showing the steps of the counting process to be executed by the communication processing apparatus according to Embodiment 3 of the present invention.

FIG. 19 and FIG. 20 are timing charts showing the steps of the counting process performed by the communication processing apparatus 30 according to Embodiment 3 of the present invention. Here, FIG. 19 shows mainly a timing chart at the time of collecting the count value for the first time after starting the counting process, and FIG. 20 shows mainly a timing chart at the time of collecting the count value for the second time after elapse of a predetermined cycle from the state shown in FIG. 19. More specifically, the timing charts shown in FIG. 19 and FIG. 20 show, in time sequence, the timings of various kinds of processes related to the control unit 31, receiving unit 32, first processing unit 341, second processing unit 342, and third processing unit 343 in this order from the upper side to the lower side.

The timing related to the control unit 31 includes timings of various kinds of processes to be executed by the control unit 31 when the computer program 31*a* is executed, based on the result of measuring time by the timer unit 36. Moreover, in FIG. 19 and FIG. 20, the count values collected from each processing unit 341, 342 and 343 and recorded in the database 35 by the control unit 31 are shown separately for each processing unit. Note that the count values indicated as the count values recorded by the control unit 31 in FIG. 19 and FIG. 20 correspond to the count value collected from the first processing unit 341, the count value collected from the second processing unit 342, and the count value collected from the third processing unit 343 in this order from the upper side.

As the timing related to the receiving unit 32, a communication frame receiving timing is shown.

The timings related to the first processing unit 341 includes timings related to the communication frame (1A), the reference pulse (1B), the flag in the detection register 3413*b* (1C), the count value of the counter 3413*c* (1D), the value of the count register 3413*d* (1E), and the communication frame outputted to the second processing unit 342 (1F).

The timings related to the second processing unit 342 includes timings related to the communication frame accepted from the first processing unit 341 (2A), the reference pulse (2B), the flag in the detection register 3421*b* (2C), the count value of the counter 3421*c* (2D), the value of the count register 3421*d* (2E), and the communication frame outputted to the third processing unit 343 (2F).

The timings related to the third processing unit 343 includes timings related to the communication frame accepted from the second processing unit 342 (3A), the reference pulse accepted from the first processing unit 341 (3B), the flag in the detection register 3431*b* (3C), the count value of the counter 3431*c* (3D), the value of the count register 3431*d* (3E), and the communication frame passed to the transmitting unit 33 (3F).

As shown in FIG. 19 and FIG. 20, the receiving unit 32 receives the communication frames indicated by reference numerals F1, F2, . . . , and outputs the received communication frames to the first processing unit 341. Further, the reference pulse indicated by reference numeral P and generated based on a count start instruction (C) outputted on a fixed cycle (for example, at intervals of one second) from the control unit 31 is inputted to the first processing unit 341. A flag is set in the detection register 3413*b*, based on the reference pulse P, more specifically at the time the detecting unit 3413*a* detects the reference pulse. Moreover, the count value of the counter 3413*c* is stored in the count register 3413*d* based on the reference pulse P, and the count value of the counter 3413*c* is returned to the initial value.

FIG. 19 shows a state in which the count value "2" of the communication frames counted by the counter 3413*c* is stored in the count register 3413*d*. On the other hand, FIG. 20 shows a state in which the count value "98" of the communication frames counted by the counter 3413*c* is stored in the count register 3413*d*.

The communication frames and reference pulse P which passed through the first processing unit 341 as described above are outputted to the second processing unit 342.

When performing processing by the first processing unit 341 as described above, the control unit 31 detects the detection of the reference pulse P with reference to the content (flag) of the detection register 3413*b* (D1). Accordingly, the control unit 31 initializes the detection register 3413*b*, that is, resets the flag (more specifically, stores "0"), reads the count value (the count value at the time the detection register 3413*d* is initialized) stored in the count register 3413*d* (R1), and records the read count value in the database 35.

At the timing shown as R1 in FIG. 19, the control unit 31 reads the count value "2" and records "2" in the database 35. At the timing shown as R1 in FIG. 20, the control unit 31 reads the count value "98" and records "100" by adding the value "2" recorded in the database 35. Further, after reading the count value in the count register 3413*d* at the timing R1, the control unit 31 initializes the count register 3413*d*, that is, resets the flag (more specifically, sets "0").

The second processing unit 342 accepts the communication frames and reference pulse P from the first processing unit 341, and sets a flag in the detection register 3421*b* based on the reference pulse P, more specifically, at the time the detecting unit 3421*a* detects the reference pulse P. Moreover, the count value of the counter 3421*c* is stored in the count register 3421*d* based on the reference pulse P, and the count value of the counter 3421*c* is returned to the initial value.

The communication frames and reference pulse P which passed through the second processing unit 342 as described above are outputted to third processing unit 343.

When performing processing by the second processing unit 342 as described above, the control unit 31 detects the detection of the reference pulse P with reference to the content (flag) of the detection register 3421*b* (D2). Accordingly, the control unit 31 initializes the detection register 3421*b*, reads the count value (the count value at the time the detection register 3421*b* is initialized) stored in the count register 3421*d* (R2), and records the read count value in the database 35. The count register 3421*d* is initialized after reading the count value.

The third processing unit 343 accepts the communication frames and reference pulse P from the second processing unit 342, and sets a flag in the detection register 3431*b* based on the reference pulse P, more specifically, at the time the detecting unit 3431*a* detects the reference pulse P. Moreover, the count value of the counter 3431*c* is stored in the count register 3431*d* based on the reference pulse P, and the count value of the counter 3431*c* is returned to the initial value. Thereafter, the third processing unit 343 outputs the communication frames to the transmitting unit 33.

When performing processing by the third processing unit 343 as described above, the control unit 31 detects the detection of the reference pulse P with reference to the content (flag) of the detection register 3431*b* (D3). Accordingly, the control unit 31 initializes the detection register 3431*b*, reads the count value (the count value at the time the detection register 3431*b* is initialized) stored in the count register 3431*d*

(R3), and records the read count value in the database 35. The count register 3431*d* is initialized after reading the count value.

FIG. 21 is a view showing a sequence of the collecting process of the count value by the communication processing apparatus 30 according to Embodiment 3 of the present invention. Note that the following processing is realized when the control unit 31 executes the computer program 31*a*.

The communication processing apparatus 30 causes the timer unit 36 to measure a predetermined time to be a cycle of a periodical totalizing process. Whenever the predetermined time passes, the timer unit 36 outputs a predetermined signal to the control unit 31 (S301). The control unit 31 starts the periodical totalizing process upon acceptance of the predetermined signal. First, the control unit 31 outputs the count start instruction to the count start instruction accepting unit 3411 of the first processing unit 341 so as to generate the reference pulse P by (S302).

Next, the control unit 31 detects the detection of the reference pulse P with reference to the content (flag) of the detection register 3413*b* of the first processing unit 341 (S303), detects the detection of the reference pulse P with reference to the content (flag) of the detection register 3421*b* of the second processing unit 342 (S304), and further detects the detection of the reference pulse P with reference to the content (flag) of the detection register 3431*b* of the third processing unit 343 (S305).

Then, the control unit 31 requests transmission of the count value stored in the count register 3413*d* of the first processing unit 341 (S306). The control unit 31 collects the count value transmitted from the first processing unit 341 based on this request (S307), and records the collected count value in the database 35 (S308). Next, the control unit 31 requests transmission of the count value stored in the count register 3421*d* of the second processing unit 342 (S309). The control unit 31 collects the count value transmitted from the second processing unit 342 based on this request (S310), and records the collected count value in the database 35 (S311). Further, the control unit 31 requests transmission of the count value stored in the count register 3431*d* of the third processing unit 343 (S312). The control unit 31 collects the count value transmitted from the third processing unit 343 based on this request (S313), and records the collected count value in the database 35 (S314).

Since the steps of the process of collecting the totalized result of the totalizing system of Embodiment 3 for collecting the totalized result from the communication processing apparatus 30 by operating the operating apparatus 50 are the same as in Embodiments 1 and 2, the explanation thereof is omitted by referring to Embodiments 1 and 2.

As shown in FIG. 19, FIG. 20 and FIG. 21, in the communication processing apparatus 30 according to Embodiment 3 of the present invention, by inserting a reference pulse P among the communication frames processed by each processing unit at predetermined intervals of one second or so, the number of communication frames processed in each processing unit while two reference pulses were detected is counted. It is thus possible to accurately count the number of the communication frames separately for each processing unit and collect the count value.

In the manner described above, the processing by the communication processing apparatus 30 of Embodiment 3 of the present invention and the totalizing process of totalizing the processing results by the operating apparatus 50 are performed.

Embodiment 4

The following description will explain Embodiment 4 of the present invention. Embodiment 4 adopts a configuration in which each processing unit comprises a plurality of counters, and a plurality of counters is used by switching.

Figure 22:
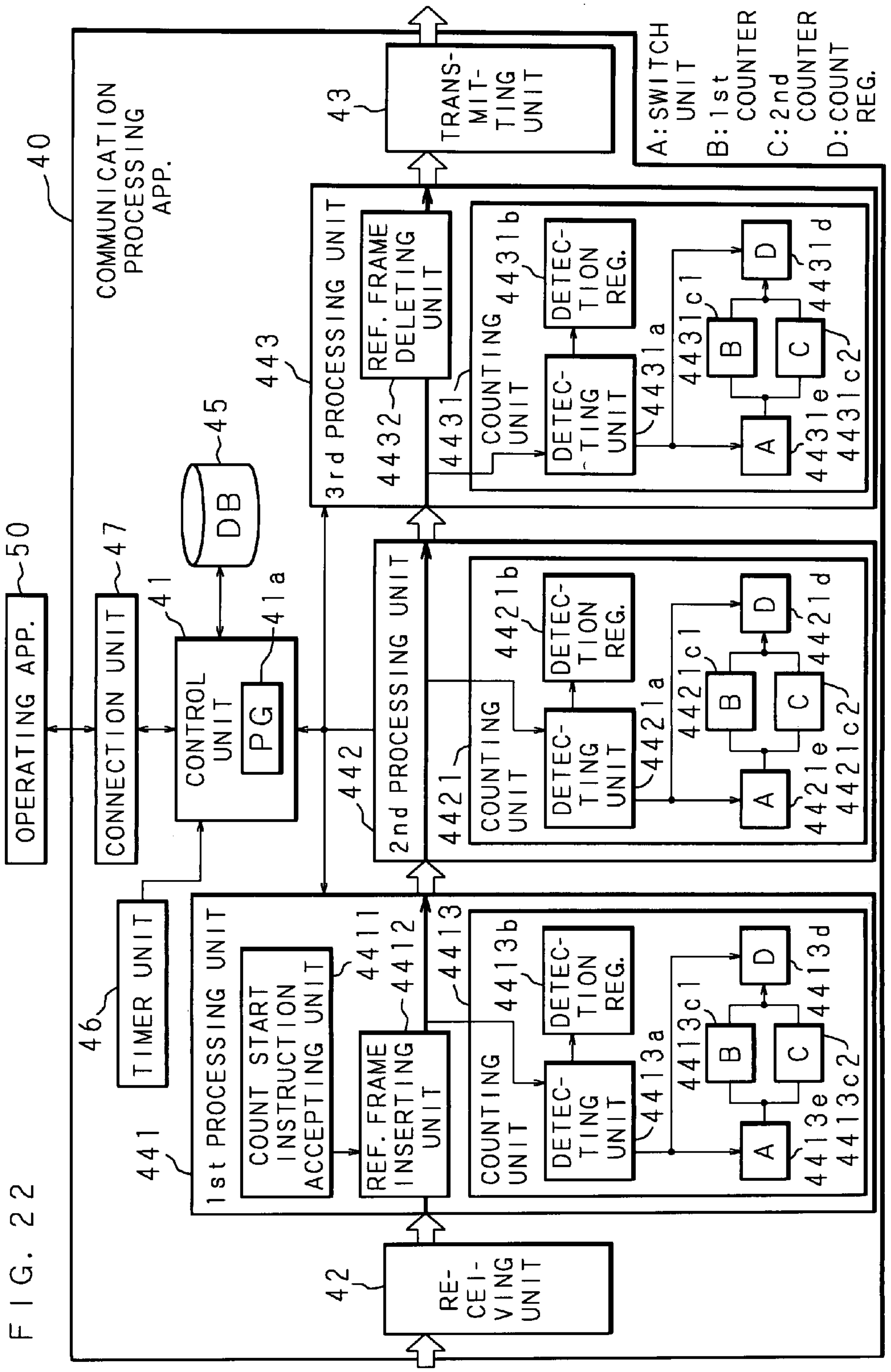
FIG. 22 is a block diagram showing a configuration example of a communication processing apparatus according to Embodiment 4 of the present invention.

FIG. 22 is a block diagram showing a configuration example of a communication processing apparatus according to Embodiment 4 of the present invention.

In FIG. 22, reference numeral 40 denotes a communication processing apparatus. The communication processing apparatus 40 comprises a control unit 41 storing a computer program 41*a*; a receiving unit 42; a transmitting unit 43; a first processing unit 441; a second processing unit 442; a third processing unit 443; a database 45; a timer unit 46; a connection unit 47, and the like. Note that the communication processing apparatus 40 is connected to an operating apparatus 50 through the connection unit 47. Here, since the configuration of the operating apparatus 50 is the same as that in Embodiment 1 described above, the explanation thereof is omitted by referring to Embodiment 1.

The communication processing apparatus 40 outputs a count start instruction from the control unit 41 to the first processing unit 441 on a predetermined cycle, for example, a one-second cycle, based on the result of measuring time by the timer unit 46. The first processing unit 441 comprises a count start instruction accepting unit 4411 for accepting the count start instruction, and a reference frame inserting unit 4412. The count start instruction accepting unit 4411 outputs a reference frame insertion instruction signal to the reference frame inserting unit 4412, based on the count start instruction accepted from the control unit 41.

The reference frame inserting unit 4412 has a function for accepting the communication frames passed from the receiving unit 42 to the first processing unit 441. After the communication frames accepted by the reference frame inserting unit 4412 is processed by the first processing unit 441, they are passed to the second processing unit 442. Also, when the count start instruction is received from the count start instruction accepting unit 4411, the reference frame inserting unit 4412 inserts the reference frame to be the counting basis between the communication frames passed sequentially from the receiving unit 42, and causes the first processing unit 441 to perform processing. The reference frame is passed to the second processing unit 442 in the same manner as the communication frames passed from the first processing unit 441 to the second processing unit 442.

The first processing unit 441 comprises a counting unit 4413 for counting communication frames. The counting unit 4413 comprises a detecting unit 4413*a* for detecting acceptance of the reference frame and the communication frame by the first processing unit 441; a detection register 4413*b* for accepting a signal outputted from the detecting unit 4413*a*; a first counter 4413*c*1 and a second counter 4413*c*2; a switch unit 4413*e* for switching them; and a count register 4413*d*. When the detecting unit 4413*a* detects the reference frame, it outputs a reference detection notification signal to the detection register 4413*b*, count register 4413*d*, and the switch unit 4413*e*. When the detecting unit 4413*a* detects the communication frame, it outputs a count signal to the switch unit 4413*e*.

When the detection register 4413*b* accepts the reference detection notification signal from the detecting unit 4413*a*, it sets a flag (more specifically, stores "1") indicating that the reference frame was detected. The flag set in the detection register 4413*b* is monitored by the control unit 41.

When the switch unit 4413*e* accepts the count signal from the detecting unit 4413*a*, it outputs the accepted count signal to the first counter 4413*c*1 or the second counter 4413*c*2. Also, when the switch unit 4413*e* accepts the reference detection notification signal, it outputs the accepted reference detection notification signal to the first counter 4413*c*1 and the second counter 4413*c*2, and switches the counter which becomes an output destination of the count signal from the first counter 4413*c*1 to the second counter 4413*c*2, or from the second counter 4413*c*2 to the first counter 4413*c*1.

The first counter 4413*c*1 and the second counter 4413*c*2 shift between two states one of which is a count mode where the count signal from the switch unit 4413*e* is accepted and the other is a waiting mode where the count signal is not accepted. In the count mode, when the count signal is accepted from the detecting unit 4413*a*, the first counter 4413*c*1 and the second counter 4413*c*2 count up. In the count mode, when the reference detection notification signal is accepted, the first counter 4413*c*1 and the second counter 4413*c*2 shift to the waiting mode, and pass the count value at that time to the count register 4413*d*, then return their count value to the initial value (resets the count value to "0"). In the waiting mode, when the first counter 4413*c*1 and the second counter 4413*c*2 accept the reference detection notification signal, they shift to the count mode.

The count register 4413*d* stores the count value accepted from the first counter 4413*c*1 or the second counter 4413*c*2 at the timing of accepting the reference detection notification signal from the detecting unit 4413*a*. Therefore, the count value stored in the count register 4413*d* becomes the number of communication frames processed by the first processing unit 441 while two reference frames were detected. The count value stored in the count register 4413*d* is collected by the control unit 41 by executing the computer program 41*a*.

The second processing unit 442 comprises a counting unit 4421 for counting communication frames. The counting unit 4421 comprises a detecting unit 4421*a* for detecting acceptance of the reference frame and the communication frame by the second processing unit 442; a detection register 4421*b* for accepting a signal outputted from the detecting unit 4421*a*; a first counter 4421*c*1 and a second counter 4421*c*2; a count register 4421*d*; and a switch unit 4421*e*. When the detecting unit 4421*a* detects the reference frame, it outputs a reference detection notification signal to the detection register 4421*b*, count register 4421*d*, and switch unit 4421*e*. When the detecting unit 4421*a* detects the communication frame, it outputs a count signal to the switch unit 4421*e*.

When the detection register 4421*b* accepts the reference detection notification signal from the detecting unit 4421*a*, it sets a flag (more specifically, stores "1") indicating that the reference frame was detected. The flag set in the detection register 4421*b* is monitored by the control unit 41.

When the switch unit 4421*e* accepts the count signal from the detecting unit 4421*a*, it outputs the accepted count signal to the first counter 4421*c*1 or the second counter 4421*c*2. Also, when the switch unit 4421*e* accepts the reference detection notification signal, it outputs the accepted reference detection notification signal to the first counter 4421*c*1 and the second counter 4421*c*2, and switches the counter which becomes an output destination of the count signal from the first counter 4421*c*1 to the second counter 4421*c*2, or from the second counter 4421*c*2 to the first counter 4421*c*1.

The first counter 4421*c*1 and the second counter 4421*c*2 shift between two states one of which is a count mode where the count signal from the switch unit 4421*e* is accepted and the other is a waiting mode where the count signal is not accepted. In the count mode, when the count signal is accepted from the detecting unit 4421*a*, the first counter 4421*c*1 and the second counter 4421*c*2 count up. In the count mode, when the reference detection notification signal is accepted, the first counter 4421*c*1 and the second counter 4421*c*2 shift to the waiting mode, and pass the count value at that time to the count register 4421*d*, then return their count value to the initial value (resets the count value to "0"). In the waiting mode, when the first counter 4421*c*1 and the second counter 4421*c*2 accept the reference detection notification signal, they are changed in the count mode.

The count register 4421*d* stores the count value accepted from the first counter 4421*c*1 or the second counter 4421*c*2 at the timing of accepting the reference detection notification signal from the detecting unit 4421*a*. Therefore, the count value stored in the count register 4421*d* becomes the number of communication frames processed by the second processing unit 442 while two reference frames were detected. The count value stored in the count register 4421*d* is collected by the control unit 41 by executing the computer program 41*a*.

The third processing unit 443 comprises a counting unit 4431 for counting the communication frames, and a reference frame deleting unit 4432 for deleting the reference frame among the communication frames. The counting unit 4431 comprises a detecting unit 4431*a* for detecting acceptance of the reference frame and the communication frame by the third processing unit 443; a detection register 4431*b* for accepting a signal outputted from the detecting unit 4431*a*; a first counter 4431*c*1 and a second counter 4431*c*2; a count register 4431*d* and a switch unit 4431*e*. When the detecting unit 4431*a* detects the reference frame, it outputs a reference detection notification signal to the detection register 4431*b*, count register 4431*d* and switch unit 4431*e*. When the detecting unit 4431*a* detects the communication frame, it outputs a count signal to the switch unit 4431*e*.

When the detecting unit 4431*a* detects the reference frame, the reference frame deleting unit 4432 deletes the detected reference frame, and passes only the communication frames to the transmitting unit 43. Here, "only the communication frames" means frames other than the reference frame if the reference frame is inserted among communication frames as in Embodiment 4 of the present invention. Therefore, for example, if information, such as a signal and a frame other than the reference frame used in Embodiment 4 of the present invention, is inserted among communication frames, it is passed to the transmitting unit 43 together with the communication frames if necessary.

When the detection register 4431*b* accepts the reference detection notification signal from the detecting unit 4431*a*, it sets a flag (more specifically, stores "1") indicating that the reference frame was detected. The flag set in the detection register 4431*b* is monitored by the control unit 41.

When the switch unit 4431*e* accepts the count signal from the detecting unit 4431*a*, it outputs the accepted count signal to the first counter 4431*c*1 or the second counter 4431*c*2. Also, when the switch unit 4431*e* accepts the reference detection notification signal, it outputs the accepted reference detection notification signal to the first counter 4431*c*1 and the second counter 4431*c*2, and switches the counter which becomes an output destination of the count signal from the first counter 4431*c*1 to the second counter 4431*c*2, or from the second counter 4431*c*2 to the first counter 4431*c*1.

The first counter 4431*c*1 and the second counter 4431*c*2 shift between two states one of which is a count mode where the count signal from the switch unit 4431*e* is accepted and the other is a waiting mode where the count signal is not accepted. In the count mode, when the count signal is accepted from the detecting unit 4431*a*, the first counter 4431*c*1 and the second counter 4431*c*2 count up. In the count mode, when the reference detection notification signal is accepted, the first counter 4431*c*1 and the second counter 4431*c*2 shift to the waiting mode, and pass the count value at that time to the count register 4431*d*, then return their count value to the initial value (resets the count value to "0"). In the waiting mode, when the first counter 4431*c*1 and the second counter 4431*c*2 accept the reference detection notification signal, they shift to the count mode.

The count register 4431*d* stores the count value accepted from the first counter 4431*c*1 or the second counter 4431*c*2 at the timing of accepting the reference detection notification signal from the detecting unit 4431*a*. Therefore, the count value stored in the count register 4431*d* becomes the number of communication frames processed by the third processing unit 443 while two reference frames were detected. The count value stored in the count register 4431*d* is collected by the control unit 41 by executing the computer program 41*a*.

The communication processing apparatus 40 according to Embodiment 4 configured as described above executes the counting process of the processed communication frames. Note that, in the counting process of the communication processing apparatus 40 according to Embodiment 4, switching from the first counter to the second counter or from the second counter to the second counter is executed every time at receiving the reference frame in each processing unit. In addition, the process by Embodiment 4 is substantially as same as the counting process by the communication processing apparatus 20 according to Embodiment 2 other than the switching of the counters, the explanation thereof is omitted by referring to Embodiment 2. Furthermore, the communication processing apparatus 40 according to Embodiment 4 executes collecting process of the count value for collecting the count value of each processing unit. In addition, the collecting process of the count value of the communication processing apparatus 40 according to Embodiment 4 is substantially as same as the collecting process of the count value of the communication processing apparatus 20 according to Embodiment 2, the explanation thereof is omitted by referring to Embodiment 2.

Embodiment 1 through Embodiment 4 described above illustrate an example in which the number of processing units is three, but the present invention is not limited to this. For example, it is possible to apply the present invention to various kinds of communication processing apparatuses comprising a plurality of devices (processing units) for processing communication frames, and it is possible to use various kinds of devices relating to various kinds of layers if they are devices for processing communication frames.

Also, in Embodiment 1 through Embodiment 4, an example where the communication frames are merely counted is described. However, the present invention is not limited to this, and it may be possible to develop in various configurations such that the communication frames are separately counted by their contents, for example, the communication frames whose data length are less than 70 bytes and the communication frames whose data length are equal to or more than 70 bytes are separately counted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication processing apparatus comprising:

a receiver configured to receive communication frames;

a plurality of processors configured to sequentially process the communication frames received by said receiver;

a transmitter configured to transmit the communication frames sequentially processed by said plurality of processors;

an appender configured to append group information indicating a group to the communication frames received by said receiver;

a changer configured to change group information to be appended to the communication frames on a predetermined cycle;

a counter configured to count the communication frames processed by each of said processors separately for each group in each of said plurality of processors;

a remover configured to remove the group information from the communication frames to be transmitted from said transmitter; and a collector configured to collect a count value counted separately for each group information appended to the communication frames in each of said plurality of processors.

2. The communication processing apparatus as set forth in claim 1, wherein said changing means appends group information while changing group information sequentially among three or more kinds of group information.

3. A communication processing apparatus comprising:

a receiver configured to receive communication frames;

a plurality of processors configured to sequentially process the communication frames received by said receiver;

a transmitter configured to transmit the communication frames sequentially processed by said plurality of processors;

an inserter configured to insert a reference frame capable of being processed by each of said plurality of processors between the communication frames received by said receiver;

a counter configured to count the communication frames processed between two reference frames in each of said plurality of processors;

a deleter configured to delete the reference frames sequentially processed by said plurality of processors; and a collector configured to collect the counted count value in each of said plurality of processors.

4. The communication processing apparatus as set forth in claim 3, wherein said inserter inserting a reference frame inserts the reference frame on a fixed cycle.

5. A communication processing apparatus comprising:

a receiver configured to receive communication frames;

a plurality of processors configured to sequentially process the communication frames received by said receiver;

a transmitter configured to transmit the communication frames sequentially processed by said plurality of processors;

an inserter configured to insert a reference frame capable of being processed by each of said plurality of processors between the communication frames received by said receiver;

a plurality of counters, each of which is configured to count the communication frames processed between two reference frames in each of said plurality of processors, and is provided in each of said plurality of processors;

a switch, provided in each of said plurality of processors, for switching said plurality of counters so that any one of counters counts the communication frames in each processor;

a deleter configured to delete the reference frames sequentially processed by said plurality of processors; and a collector configured to collect the count value counted by each of said plurality of counters in each of said plurality of processors, from any of said plurality of counters having finished counting in each of said plurality of processors.

6. The communication processing apparatus as set forth in claim 5, wherein said inserter for inserting a reference frame inserts the reference frame on a fixed cycle.

7. A communication processing apparatus comprising:

a receiver configured to receive communication frames;

a plurality of processors configured to sequentially process the communication frames received by said receiver;

a transmitter configured to transmitt the communication frames sequentially processed by said plurality of processors;

a generator configured to generate a reference signal;

a transmitter configured to transmit the generated reference signal to each of said plurality of processors in synchronism with a time at which the communication frames are processed in each of said plurality of processors;

a counter configured to count the communication frames processed between two received reference frames in each of said plurality of processors; and a collector configured to collect the counted count value in each of said plurality of processors.

8. The communication processing apparatus as set forth in claim 7, wherein said transmitter for transmitting a reference signal transmits the reference signal on a fixed cycle.

9. A communication processing apparatus comprising: a receiver for receiving communication frames; a plurality of processors for sequentially processing the communication frames received by said receiver; a transmitter for transmitting the communication frames sequentially processed by said plurality of processors; and a controller capable of performing the following operations:

appending group information indicating a group to the communication frames received by said receiver;

changing group information to be appended to the communication frames on a predetermined cycle;

counting the communication frames processed by each of said plurality of processors separately for each group in each of said plurality of processors;

removing the group information from the communication frames to be transmitted from said transmitter; and collecting the count value counted separately for each group information appended to the communication frames in each of said plurality of processors.

10. The communication processing apparatus as set forth in claim 9, wherein in the operation of changing group information on a predetermined cycle, group information is appended to the communication frames while changing group information sequentially among three or more kinds of group information.

11. A communication processing apparatus comprising: a receiver for receiving communication frames; a plurality of processors for sequentially processing the communication frames received by said receiver; a transmitter for transmitting the communication frames sequentially processed by said plurality of processors; and a controller capable of performing the following operations:

inserting a reference frame capable of being processed by each of said plurality of processors between the communication frames received by said receiver;

counting the communication frames processed between two reference frames in each of said plurality of processors;

deleting the reference frames sequentially processed by said plurality of processors; and collecting the counted count value in each of said plurality of processors.

12. The communication processing apparatus as set forth in claim 11, wherein in the operation of inserting a reference frame, the reference frame is inserted on a fixed cycle.

13. A communication processing apparatus comprising: a receiver configured to receive communication frames; a plurality of processors sequentially process the communication frames received by said receiver; a transmitter configured to transmit for transmitting the communication frames sequentially processed by said plurality of processors; and a controller capable of performing the following operations:

inserting a reference frame capable of being processed by each of said plurality of processors between the communication frames received by said receiver;

by a plurality of counters, each of which is configured to count the communication frames processed between two reference frames in each of said plurality of processors, where a plurality of said counters are provided in each of said plurality of processors;

switching said plurality of counters so that any one of counters counts the communication frames in each processor;

deleting the reference frames sequentially processed by said plurality of processors; and collecting the count value counted by each of said plurality of counters in each of said plurality of processors from any of said plurality of counters having finished the counting in each of said plurality of processors.

14. The communication processing apparatus as set forth in claim 13, wherein in the operation of inserting a reference frame, the reference frame is inserted on a fixed cycle.

15. A communication processing apparatus comprising: a receiver for receiving communication frames; a plurality of processors for sequentially processing the communication frames received by said receiver; a transmitter for transmitting the communication frames sequentially processed by said plurality of processors; and a controller capable of performing the following operations:

generating a reference signal;

transmitting the generated reference signal to each of said plurality of processors in synchronism with a time at which the communication frames are processed in each of said plurality of processors;

counting the communication frames processed between two received reference frames in each of said plurality of processors; and collecting the counted count value in each of said plurality of processors.

16. The communication processing apparatus as set forth in claim 15, wherein in the operation of transmitting a reference signal, the reference signal is transmitted on a fixed cycle.

17. A totalizing system including:

a communication processing apparatus which comprises: a receiver for receiving communication frames; a plurality of processors for sequentially processing the communication frames received by said receiver; a transmitter for transmitting the communication frames sequentially processed by said plurality of processors; an appender configured to append group information indicating a group to the communication frames received by said receiver; a changer configured to change group information to be appended to the communication frames on a predetermined cycle; a counter for counting the communication frames processed by each of said processors separately for each group in each of said plurality of processors; remover configured to remove the group information from the communication frames to be transmitted from said transmitter; and a collector configured to collect a count value counted separately for each group information appended to the communication frames in each of said plurality of processors; and an operating apparatus connected to said communication processing apparatus, wherein said operating apparatus includes a requester for requesting transmission of a totalized result collected by said communication processing apparatus; and a collector configured to collect the totalized result corresponding to the request from said communication processing apparatus.

18. The totalizing system as set forth in claim 17, wherein said changer appends group information while changing group information sequentially among three or more kinds of group information.

19. A totalizing system including:

a communication processing apparatus which comprises: a receiver for receiving communication frames; a plurality of processors for sequentially processing the communication frames received by said receiver; a transmitter for transmitting the communication frames sequentially processed by said plurality of processors; an inserter configured to insert a reference frame capable of being processed by each of said plurality of processors between the communication frames received by said receiver; a counter for counting the communication frames processed between two reference frames in each of said plurality of processors; a deleter configured to delete the reference frames sequentially processed by said plurality of processors; and a collector configured to collect the counted count value in each of said plurality of processors; and an operating apparatus coupled to said communication processing apparatus;

wherein said operating apparatus includes a requester configured to request transmission of a totalized result collected by said communication processing apparatus; and a collector configured to collect the totalized result corresponding to the request from said communication processing apparatus.

20. The totalizing system as set forth in claim 19, wherein said an inserter configured to insert a reference frame inserts the reference frame on a fixed cycle.

21. A totalizing system including:

a communication processing apparatus which comprises: a receiver for receiving communication frames; a plurality of processors for sequentially processing the communication frames received by said receiver; a transmitter for transmitting the communication frames sequentially processed by said plurality of processors; an inserter configured to insert a reference frame capable of being processed by each of said plurality of processors between the communication frames received by said receiver; a counter for counting the communication frames processed between two reference frames in each of said plurality of processors, where a plurality of said counters are provided in each of said plurality of processors; a switch, provided in each of said plurality of processors, for switching said plurality of counters so that any one of counters counts the communication frames in each processor; a deleter configured to delete the reference frames sequentially processed by said plurality of processors; and a collector configured to collect the count value counted by said counter in each of said plurality of processors from counter that finishes the counting by each of said plurality of processors; and an operating apparatus coupled to said communication processing apparatus;

wherein said operating apparatus includes a requester configured to request transmission of a totalized result collected by said communication processing apparatus; and a collector configured to collect the totalized result corresponding to the request from said communication processing apparatus.

22. The totalizing system as set forth in claim 21, wherein said means for inserting a reference frame inserts the reference frame on a fixed cycle.

23. A totalizing system including:

a communication processing apparatus which comprises: a receiver for receiving communication frames; a plurality of processors for sequentially processing the communication frames received by said receiver; a transmitter for transmitting the communication frames sequentially processed by said plurality of processors; a generator for generating a reference signal; a transmitter configured to transmit the generated reference signal to each of said plurality of processors in synchronism with a time at which the communication frames are processed in each of said plurality of processors; a counter for counting the communication frames processed between two received reference frames in each of said plurality of processors; and a collector configured to collect the counted count value in each of said plurality of processors; and an operating apparatus coupled to said communication processing apparatus;

wherein said operating apparatus includes a requester configured to request transmission of a totalized result collected by said communication processing apparatus; and a collector configured to collect the totalized result corresponding to the request from said communication processing apparatus.

24. The totalizing system as set forth in claim 23, wherein said transmitter for transmitting a reference signal transmits the reference signal on a fixed cycle.

* * * * *